(12) United States Patent
Mochizuki

(10) Patent No.: US 10,126,468 B2
(45) Date of Patent: Nov. 13, 2018

(54) ACHROMATIC POLARIZING PLATE WITH HIGH-TRANSMISSIVITY AND HIGH-DEGREE OF POLARIZATION

(71) Applicants: Nippon Kayaku Kabushiki Kaisha, Tokyo (JP); Polatechno Co., Ltd., Niigata (JP)

(72) Inventor: Noriaki Mochizuki, Tokyo (JP)

(73) Assignees: Nippon Kayaku Kabushiki Kaisha, Tokyo (JP); Polatechno Co. Ltd., Niigata (JP)

( * ) Notice: Subject to any disclaimer, the term of this patent is extended or adjusted under 35 U.S.C. 154(b) by 45 days.

(21) Appl. No.: 15/316,203

(22) PCT Filed: Jun. 2, 2015

(86) PCT No.: PCT/JP2015/065834
§ 371 (c)(1),
(2) Date: Dec. 19, 2016

(87) PCT Pub. No.: WO2015/186681
PCT Pub. Date: Dec. 10, 2015

(65) Prior Publication Data
US 2017/0153361 A1    Jun. 1, 2017

(30) Foreign Application Priority Data
Jun. 3, 2014    (JP) .................................. 2014-114673

(51) Int. Cl.
| | | |
|---|---|---|
| *G02B 1/08* | (2006.01) | |
| *G02F 1/1335* | (2006.01) | |
| *C09B 31/22* | (2006.01) | |
| *C09B 45/28* | (2006.01) | |
| *G02B 1/14* | (2015.01) | |
| *C09B 31/072* | (2006.01) | |
| *C09B 31/20* | (2006.01) | |
| *C09B 31/30* | (2006.01) | |
| *G02B 5/30* | (2006.01) | |
| *C09B 67/22* | (2006.01) | |

(52) U.S. Cl.
CPC .............. *G02B 1/08* (2013.01); *C09B 31/072* (2013.01); *C09B 31/20* (2013.01); *C09B 31/22* (2013.01); *C09B 31/30* (2013.01); *C09B 45/28* (2013.01); *C09B 67/0046* (2013.01); *G02B 1/14* (2015.01); *G02B 5/305* (2013.01); *G02B 5/3033* (2013.01); *G02F 1/133533* (2013.01); *G02F 1/133528* (2013.01); *G02F 2203/04* (2013.01); *Y10T 428/1041* (2015.01)

(58) Field of Classification Search
CPC ........ G02B 5/305; G02B 5/3033; G02B 1/08; G02B 1/14; G02F 1/133528; G02F 1/133533; C09B 45/28; C09B 45/34; C09B 33/10; C09B 31/20; C09B 31/22; C09B 31/30; C09B 67/0046; Y10T 428/1041
See application file for complete search history.

(56) References Cited

U.S. PATENT DOCUMENTS

| | | |
|---|---|---|
| 5,318,856 A | 6/1994 | Misawa et al. |
| 5,926,310 A | 7/1999 | Tamura et al. |
| 6,399,752 B1 | 6/2002 | Ohta et al. |
| 6,606,136 B2 | 8/2003 | Matsumoto et al. |
| 6,790,490 B1 | 9/2004 | Oiso et al. |
| 2004/0218118 A1 | 11/2004 | Hayashi |
| 2014/0085721 A1 | 3/2014 | Mochizuki et al. |
| 2016/0041321 A1 | 2/2016 | Mochizuki |

FOREIGN PATENT DOCUMENTS

| | | |
|---|---|---|
| EP | 05493472 A2 | 6/1993 |
| EP | 2983020 A1 | 12/2013 |
| EP | 2717076 A1 | 4/2014 |
| JP | 3-12606 A | 1/1991 |
| JP | 5-295281 A | 11/1993 |
| JP | 9-302250 A | 11/1997 |
| JP | 11-218611 A | 8/1999 |
| JP | 3357803 B2 | 12/2002 |
| JP | 2003-215338 A | 7/2003 |
| JP | 4162334 B2 | 10/2008 |
| JP | 4281261 B2 | 6/2009 |
| JP | 4360100 B2 | 11/2009 |
| JP | 4815721 B2 | 11/2011 |
| WO | 2012/165223 A1 | 12/2012 |
| WO | 2014/162635 A1 | 10/2014 |
| WO | 2015/111472 A1 | 7/2015 |

OTHER PUBLICATIONS

European communication dated Oct. 27, 2017 in corresponding European patent application No. 15803907.3.
Masahiro Irie, "Kinousei Shikiso no Ouyou (Application of Functional Dyes)", First Edition, CMC Publishing Co., pp. 98-100, 2002.

*Primary Examiner* — Sophie Hon
(74) *Attorney, Agent, or Firm* — Nields, Lemack & Frame, LLC

(57) ABSTRACT

This achromatic polarizing plate has a high transmissivity, while expressing an achromatic white color when the absorption axes of the polarizing elements are positioned in parallel, and expressing an achromatic black color when the absorption axes of the polarizing elements are positioned orthogonally to one another. This polarizing element contains at least two specific azo compounds, and the absolute value of the difference between the average transmissivity of 420 nm to 480 nm light and the average transmissivity of 520 nm to 590 nm light is equal to or less than 2.5, and the absolute value of the difference between the average transmissivity of 520 nm to 590 nm light and the average transmissivity of 590 nm to 640 nm light is equal to or less than 2.0.

21 Claims, No Drawings

ACHROMATIC POLARIZING PLATE WITH HIGH-TRANSMISSIVITY AND HIGH-DEGREE OF POLARIZATION

TECHNICAL FIELD

The present invention relates to a dye system polarizing element and a polarizing plate.

BACKGROUND ART

Polarizing elements are generally manufactured by adsorbing and orienting iodine, which is a dichroism pigment, or a dichroism dye onto and into a polyvinyl alcohol resin film. Polarizing plates are made by adhering a protection film made of triacetylcellulose, etc. on at least one surface of these polarizing elements via an adhesive layer to be used for a liquid crystal display, etc. Polarizing plates which use iodine as a dichroism pigment are referred to as iodic polarizing plates, while polarizing plates which use a dichroism dye as a dichroism pigment are referred to as dye polarizing plates. Of these plates, dye polarizing plates are characterized in that they have high heat resistance, high humidity, heat durability, and high stability, and have high color selectivity due to formulation thereof, while dye polarizing plates are problematic in that the transmittance thereof is lower than that of iodic polarizing plates having the same degree of polarization, that is, the contrast is low. Therefore, a dye polarizing plate is desired which maintains high durability, and has various color selectivities, high polarization properties and higher transmittance. However, even such dye polarizing plates with various color selectivities have up until now had polarizing elements that express a yellow tinge when the dye polarizing plate is arranged in parallel with the absorption axes while indicating white. When manufacturing a polarizing plate with a softened yellow tinge expressed when arranged in parallel in order to improve this yellow tinge when arranged in parallel, the polarizing element is problematic in that it expresses blue when arranged orthogonally to the absorption axes while indicating black. In particular, it is difficult to obtain a high-grade white polarizing plate, commonly referred to as "Paper White" polarizing plate. It is necessary for an achromatic polarizing plate to be independent of any wavelength when positioned in parallel or orthogonal, but have substantially specific transmittance, with such a polarizing plate having been impossible to obtain until now. The reason why the color in the parallel position is different from the orthogonal position is that, even if a dichroism pigment is used as the polarizing element, wavelength dependence is not the same in the parallel position and the orthogonal position; particularly, the transmittance at each wavelength is not specific, and further, the dichroism is not specific. Here, according to the explanation regarding one example of an iodic polarizing plate, a polyvinyl alcohol (hereinafter, abbreviated as PVA) is defined as a substrate; further, generally speaking, when iodine is used as a dichroism pigment, the iodic polarizing plate mainly absorbs at 480 nm to 600 nm. The absorption at 480 nm is said to be due to a polyiodine $I_3^-$ and PVA complex, while the absorption at 600 nm is due to a polyiodine $I_5^-$ and PVA complex. With respect to the degree of polarization (dichroism) based on each wavelength, the degree of polarization (dichroic ratio) based on the polyiodine $I_5^-$ and PVA complex is higher than the degree of polarization (dichroism) based on the polyiodine $I_3^-$ and PVA complex. This means that, when the transmittance is tried to be fixed in the orthogonal position at each wavelength, the transmittance at 600 nm is higher than that of 480 nm in the parallel position, resulting in the phenomenon in which light in the parallel position exhibits a yellow tinge. In contrast, when the transmittance is tried to be fixed in the parallel position, the transmittance at 600 nm is lower than that at 480 nm in the orthogonal position, resulting in light in the orthogonal position expressing blue. Further, since there is no absorption due to the complex mainly based on 550 nm with high visibility, the color phase is difficult to control. In other words, since the degree of polarization (dichroic ratio) at each wavelength is not fixed, wavelength dependence is generated. Moreover, the color cannot be adjusted since the dichroism pigment is determined.

Accordingly, wavelength dependence in the parallel position is also different from the orthogonal position in azo compounds with a dichroism other than the iodic polarizing plate, such that almost no pigment exists that expresses the same color phase in the parallel position and the orthogonal position; moreover, even if such a pigment existed, the dichroism (polarization properties) thereof would be low. Depending on the kinds of azo compounds with dichroism, an azo compound having wavelength dependence quite different in the orthogonal position and the parallel position exists, for example, expressing yellow in the parallel position and blue in the orthogonal position; moreover, contrast between brightness and darkness of light is also generated by controlling the polarization in the orthogonal position and the parallel position, wherein, as color sensitivity is also different from person to person with respect to the contrast between brightness and darkness provided, color correction suitable for each contrast between brightness and darkness is required assuming that a color correction is made. Such a color correction can only be achieved when the transmittance at each wavelength is substantially specific in the respective parallel and orthogonal positions; specifically, a state in which there is no transmittance dependency at each wavelength at a specific value is required. Moreover, regarding the polarizing elements or polarizing plate, the specific transmittance dependency thereof should be simultaneously satisfied in the parallel position and the orthogonal position; further, the degree of polarization (dichroic ratio) at each wavelength should be specific in order to have high transmittance and high contrast. Even when only azo compound is applied to the polarizing elements, each wavelength dependence is different in the orthogonal position and parallel position. Moreover, when several compounds are formulated, the relation between the transmittance in the parallel position and the orthogonal position and the dichroic ratio be finely controlled. On the other hand, even if the relation between the transmittance in the parallel position and the orthogonal position and the dichroic ratio is finely controlled, and the transmittance can be made constant in each case, an achromatic polarizing plate with high transmittance and high contrast cannot be realized. In other words, an achromatic polarizing plate with a high degree of polarization or an achromatic polarizing plate with high transmittance cannot be achieved. From this, it has been found very difficult to obtain an achromatic polarizing plate with high transmittance and/or high contrast, such that an achromatic polarizing plate with a high degree of polarization or an achromatic polarizing plate with high transmittance cannot be achieved only by applying a dichroism pigment of three primary colors thereto. It is also very difficult to make the parallel position specific while simultaneously controlling high dichroism. Particularly, a high-grade white color cannot be expressed even when a different color is slightly mixed with a white color. Moreover, a white color in a bright state is particularly desired since it has high brightness and high sensitivity. Consequently, although a polarizing plate that expresses a high grade paper-like achromatic white in white display while further expressing an achromatic black color in black display is desired as a polarizing element, to date there has been no polarizing plate that expresses achromatic white in white display with a single body transmittance greater than or equal to 35%, expresses an achromatic black color in black display and, further, has a higher degree of polarization.

PRIOR ART DOCUMENTS

Patent Documents

PATENT DOCUMENT 1: JP 4281261 B
PATENT DOCUMENT 2: JP 3357803 B

Non-Patent Document

NON-PATENT DOCUMENT 1: Kinousei Shikiso no Ouyou (Application of functional pigments), First Edition, CMC Publishing Co., Ltd., supervised by Masahiro Irie, P98 to 100

SUMMARY OF THE INVENTION

Problems to be Solved by the Invention

As a method to improve the color phase of a polarizing plate, the technologies as described in PATENT DOCUMENT 1 or PATENT DOCUMENT 2 are disclosed. Although a neutral coefficient is calculated and a polarizing plate with an absolute value from 0 to 3 is disclosed in PATENT DOCUMENT 1, as understood from the examples, since only the color phase in the parallel position obtained from JIS Z 8729 has value a* from −2 to −1 and value b* from 2.5 to 4.0, even if the neutral coefficient (Np) is low, it has been found that this polarizing plate expresses a yellow-green color when it should indicate white. Moreover, the color phase in the orthogonal position of the polarizing plate has value a* from 0 to 1 but value b* from −1.5 to −4.0, resulting in the polarizing plate expressing blue. Although PATENT DOCUMENT 2 discloses a polarizing element, wherein the transmittance at 410 nm to 750 nm is within ±30% or less of the average value, in addition to iodine, a direct dye, a reaction dye, or an acid dye is added and adjusted, this polarizing element is a polarizing element obtained by creating a color measured using only one polarizing element, namely, a single body transmittance, into an absolute value of 2 or less using value a and value b in UCS color space, such that an achromatic color cannot simultaneously express the color phases when a white color should be indicated (for the case in which the polarizing plates are positioned in parallel) and a black color should be indicated (for the case in which the polarizing plates are positioned orthogonally) using two polarizing plates. Moreover, as understood from the examples, in which the average value of the single body transmittance is 31.95% in Example 1 and 31.41% in Example 2, since the transmittance is low for a field requiring high transmittance and high contrast, in particular, the field of a liquid crystal display, organic electroluminescence, etc., the polarizing plate does not achieve sufficient performance at a higher transmittance and a higher degree of polarization. Particularly, a polarizing plate with high transmittance, specifically a single body transmittance greater than or equal to 40%, is not obtained; in particular, up until now, the higher the transmittance, the more difficult it has been to obtain an achromatic polarizing plate, creating a need for an achromatic polarizing plate having a higher transmittance which expresses white in the parallel position and black in the orthogonal position. Further, in Example 1 and Example 2, a polarizing element or a polarizing plate with good durability is not achieved since iodine is also used as the main dichroism pigment, resulting in the color significantly changing upon durability testing, particularly humidity and heat durability testing.

Means for Solving the Problems

The present inventor has conducted intensive studies in order to solve the above-mentioned problems. As a result, he has newly found that only specific formulations of azo compounds can achieve, in each of the parallel position and the orthogonal position, to fix a transmittance which does not depend on wavelength, and to fix degrees of polarization in the parallel position and the orthogonal position, to have a high degree of polarization, and to maintain the relationship while even having a high transmittance, and thus has developed the polarizing elements or polarizing plates which can realize a high grade paper-like white, referred to as "Paper White". In other words, the polarizing elements comprise specific azo compounds, and are characterized in that an absolute value of the difference between the average transmittance at 420 nm to 480 nm and the average transmittance at 520 nm to 590 nm is equal to or less than 2.5, and an absolute value of the difference between the average transmittance at 520 nm to 590 nm and the average transmittance at 590 nm to 640 nm is equal to or less than 2.0; thereby, the polarizing elements which expressed an achromatic property, namely, a high grade paper-like white, in the parallel position, have a high contrast, and have a high degree of polarization while even having a high transmittance were obtained. The present inventor has found to obtain the polarizing elements or polarizing plates which can express, while even having a high transmittance, an achromatic white when the absorption axes of the polarizing elements are positioned in parallel and can express an achromatic black when the absorption axes of the polarizing elements are positioned orthogonally, and which have a high degree of polarization and further have high durability.

In other words, the present invention relates to the following matters:

(1) A polarizing element, comprising an azo compound represented by formula (1) or a salt thereof and an azo compound represented by formula (2) or a salt thereof, wherein the absolute value of the difference between the average transmittance at 420 nm to 480 nm and the average transmittance at 520 nm to 590 nm is equal to or less than 2.5, and the absolute value of the difference between the average transmittance at 520 nm to 590 nm and the average transmittance at 590 nm to 640 nm is equal to or less than 2.0:

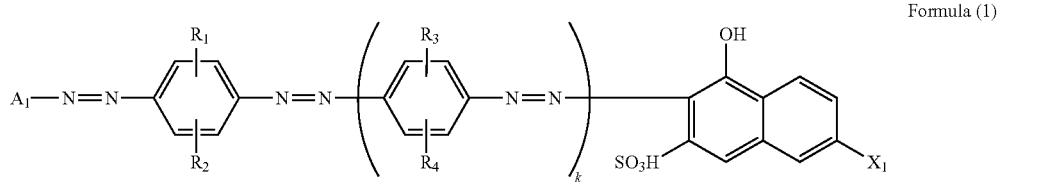

Formula (1)

wherein $A_1$ represents a phenyl group or a naphthyl group having a substituent, $R_1$ to $R_4$ each independently represent any of a hydrogen atom, a lower alkyl group, a lower alkoxy group, or a lower alkoxy group having a sulfo group, $X_1$ represents an amino group that may have a substituent, and k represents an integer of 0 or 1; and

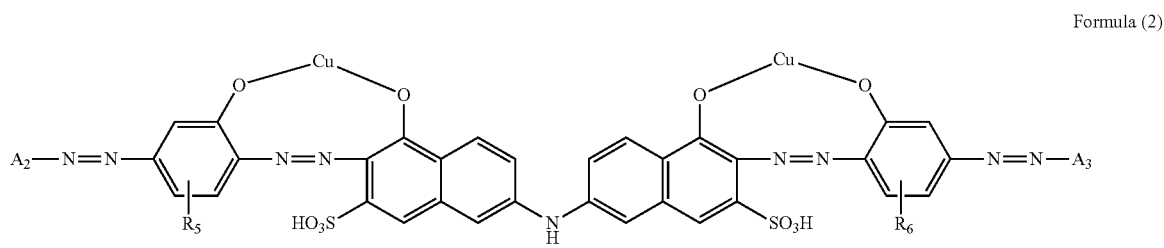

Formula (2)

wherein $A_2$ and $A_3$ each independently represent a naphthyl group or a phenyl group having one or more substituents, at least one of the substituents is a sulfo group, a lower alkyl group, a lower alkoxy group, a lower alkoxy group having a sulfo group, a carboxy group, a nitro group, an amino group, or a substituted amino group, and $R_5$ and $R_6$ each independently represent any of a hydrogen atom, a lower alkyl group, a lower alkoxy group, or a lower alkoxy group having a sulfo group.

(2) The polarizing element according to (1), wherein, in value a* and value b* obtained according to JIS Z 8729, the absolute values of value a* and value b* when single body transmittances are measured are equal to or less than 1, and the absolute values of value a* and value b* obtained using two of said polarizing elements in which their absorption axes are positioned in parallel are equal to or less than 2.

(3) The polarizing element according to (1) or (2), wherein a single body transmittance of said polarizing element is between 35% and 60%, and in each wavelength transmittance obtained using two of said polarizing elements in which their absorption axes are positioned in parallel, the average transmittance at 520 nm to 590 nm is between 25% and 55%.

(4) The polarizing element according to any one of (1) to (3), wherein the polarizing element comprises at least one azo compound represented by the following formula (3) or a salt thereof and at least one azo compound represented by the following formula (4) or a salt thereof as azo compounds represented by formula (1) or salts thereof:

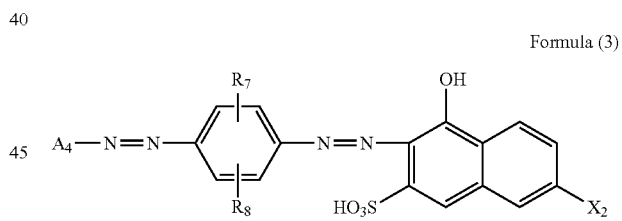

Formula (3)

wherein $A_4$ represents a phenyl group or a naphthyl group having a substituent, $R_7$ and $R_8$ each independently represent any of a hydrogen atom, a lower alkyl group, a lower alkoxy group, or a lower alkoxy group having a sulfo group, and $X_2$ represents a phenyl amino group that may have a substituent, or a benzoyl amino group that may have a substituent; and

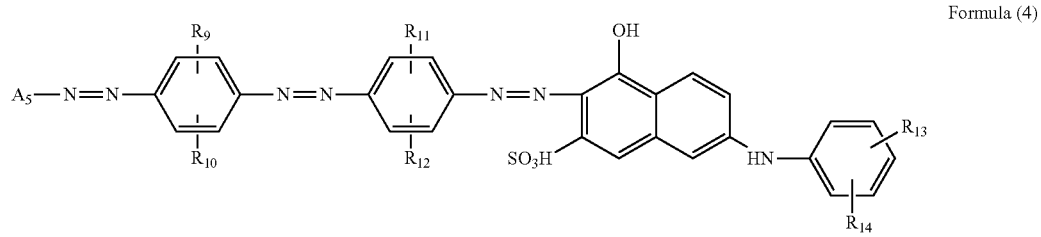

Formula (4)

wherein $A_5$ represents a phenyl group or a naphthyl group having a substituent, $R_9$ to $R_{12}$ each independently represent any of a hydrogen atom, a lower alkyl group, a lower alkoxy group, or a lower alkoxy group having a sulfo group, $R_{13}$ and $R_{14}$ each independently represent any of a hydrogen atom, a methyl group, a methoxy group, a sulfo group, an amino group or a substituted amino group, except that all of $R_9$ to $R_{12}$ are simultaneously lower alkoxy groups.

(5) The polarizing element according to any one of (1) to (4), wherein the polarizing element further comprises an azo compound represented by the following formula (5) or a salt thereof in addition to the azo compound represented by formula (1) or a salt thereof and the azo compound represented by formula (2) or a salt thereof.

Formula (5)

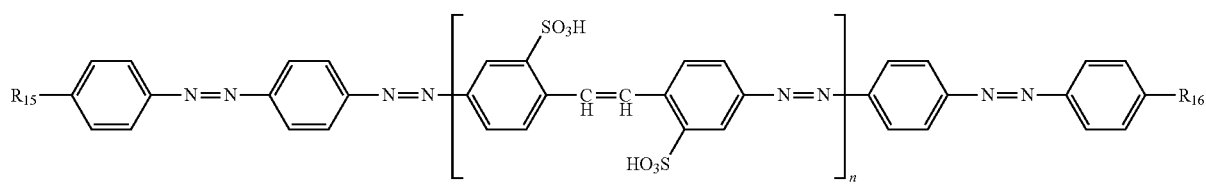

wherein $R_{15}$ and $R_{16}$ each independently represent any of a sulfo group, a carboxy group, a hydroxy group, a lower alkyl group, or a lower alkoxyl group, and n represents an integer from 1 to 3.

(6) The polarizing element according to (5), wherein the polarizing element comprises an azo compound represented by formula (3) or a salt thereof and an azo compound represented by formula (4) or a salt thereof as azo compounds represented by formula (1) or salts thereof.

(7) The polarizing element according to any one of (1) to (6), wherein, in each wavelength transmittance obtained using two of said polarizing elements in which their absorption axes are positioned orthogonally, the absolute value of the difference between the average transmittance at 420 nm to 480 nm and the average transmittance at 520 nm to 590 nm is equal to or less than 0.3, and the absolute value of the difference between the average transmittance at 520 nm to 590 nm and the average transmittance at 600 nm to 640 nm is equal to or less than 0.3.

(8) The polarizing element according to any one of (1) to (7), wherein the absolute values of value a* and value b* obtained using two of said polarizing elements in which their absorption axes are positioned orthogonally are equal to or less than 2.

(9) The polarizing element according to any one of (4) to (8), wherein $X_2$ in formula (3) is a phenyl amino group that may have a substituent, and the substituent of the phenyl group being any of a hydrogen atom, a methyl group, a methoxy group, a sulfo group, or an amino group.

(10) The polarizing element according to any one of (4) to (9), wherein at least one of $R_{13}$ and $R_{14}$ in formula (4) is any of a hydrogen atom, a methyl group, a methoxy group, a sulfo group, or an amino group.

(11) The polarizing element according to any one of (4) to (10), wherein $A_4$ in formula (3) is a phenyl group having any substituent from among a methyl group, a methoxy group, a sulfo group, an amino group, or a benzoyl group.

(12) The polarizing element according to any one of (4) to (10), wherein $A_5$ in formula (4) is a phenyl group having any substituent from among a methyl group, a methoxy group, a sulfo group, an amino group, or a benzoyl group.

(13) The polarizing element according to any one of (1) to (12), wherein $A_2$ and $A_3$ in formula (2) are each, independently, a naphthyl group having two or more sulfo groups.

(14) The polarizing element according to any one of (1) to (13), wherein at least one of $R_5$ and $R_6$ in formula (2) is a methyl group.

(15) The polarizing element according to any one of (4) to (14), wherein at least one of $R_{11}$ and $R_{12}$ in formula (4) is a methoxy group.

(16) The polarizing element according to any one of (4) to (15), wherein at least one of $R_9$ and $R_{10}$ in formula (4) is a methoxy group.

(17) The polarizing element according to any one of (1) to (16), wherein the substrate is made of a polyvinyl alcohol resin film.

(18) The polarizing element according to any one of (1) to (17), wherein the polarizing element has a single body transmittance between 35% and 60% and has a degree of polarization greater than or equal to the value obtained by formula (6):

$$\rho y = -0.0906 \times Ys^2 + 5.97 \times Ys \qquad \text{formula (6)}$$

wherein Ys represents a single body transmittance, and $\rho y$ represents a degree of polarization.

(19) A polarizing plate, made by providing a protection film on at least one surface of the polarizing element according to any one of (1) to (18).

(20) A liquid crystal display, employing the polarizing element according to any one of (1) to (18) or the polarizing plate according to (19).

Effects of the Invention

According to the present invention, the polarizing elements which can express high-grade white in the parallel position while having a high degree of polarization has been realized. Further, the polarizing elements or polarizing plates which express achromatic black and which have high contrast and high durability when the absorption axes of the polarizing elements are positioned orthogonally, while having high transmittance, were obtained.

EMBODIMENTS CARRYING OUT THE INVENTION

The present invention is characterized by a polarizing element comprising a dichroism dye made of azo compounds, the polarizing element comprising an azo compound represented by formula (1) or a salt thereof and an azo compound represented by formula (2) or a salt thereof, wherein the absolute value of the difference between the average transmittance at 420 nm to 480 nm and the average transmittance at 520 nm to 590 nm is equal to or less than 2.5, and the absolute value of the difference between the average transmittance at 520 nm to 590 nm and the average transmittance at 590 nm to 640 nm is equal to or less than 2.0.

The azo compounds used for the present invention are an azo compound represented by formula (1) or a salt thereof and an azo compound represented by formula (2) or a salt thereof. Herein, the "lower" of the alkyl groups and the lower alkoxy groups of the present invention means that the carbon number is from 1 to 3.

the substituents is a sulfo group, and the other substituent(s) is(are) a sulfo group, a hydroxy group, a carboxy group, or a lower alkoxy group having a sulfo group. A straight chain alkoxy group is preferable as a lower alkoxy group having a sulfo group, and the terminal of the alkoxy group is preferable as the substitution position of the sulfo group. More preferred is a 3-sulfopropoxy group or a 4-sulfobutoxy group, and particularly preferred is a 3-sulfopropoxy group. When the substituent number of the sulfo groups is 2, the combination of the 4- and 8-positions or the combination of the 6- and 8-positions is preferable, and the combination of the 6- and 8-positions is particularly preferable as the

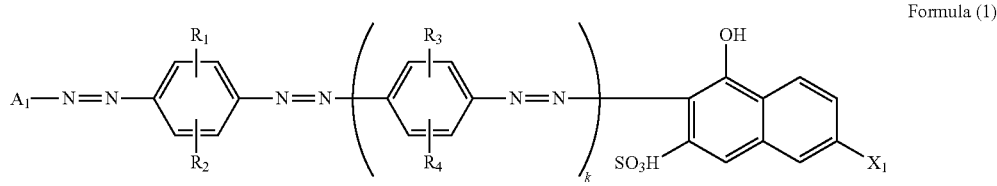

Formula (1)

Wherein, $A_1$ represents a phenyl group or a naphthyl group having a substituent, $R_1$ to $R_4$ each independently represent a hydrogen atom, a lower alkyl group, a lower alkoxy group, or a lower alkoxy group having a sulfo group, $X_1$ represents an amino group that may have a substituent, and k represents an integer of 0 or 1. Further, in the Claims and specifications of the present application, a "substituent" may include a hydrogen atom, but it will be described as a "substituent" for convenience.

$A_1$ represents a phenyl group or a naphthyl group having a substituent; wherein, when $A_1$ is a phenyl group, it preferably has at least one of a sulfo group or a carboxy group as a substituent thereof, whereas, when it has two substituents, it is preferable that at least one of the substituents is a sulfo group or a carboxy group and the other substituent(s) is(are) a sulfo group, a carboxy group, a lower alkyl group, a lower alkoxy group, a lower alkoxy group having a sulfo group, a nitro group, an amino group, an acetyl amino group or a lower alkyl amino group. More preferred is a sulfo group, a methyl group, an ethyl group, a methoxy group, an ethoxy group, a carboxyl group, a nitro group, or an amino group, and particularly preferred is a sulfo group, a methyl group, a methoxy group, an ethoxy group, or a carboxy group. A straight chain alkoxy group is preferable as a lower alkoxy group having a sulfo group, and the terminal of the alkoxy group is preferable as the substitution position of the sulfo group. More preferred is a 3-sulfopropoxy group or a 4-sulfobutoxy group, and particularly preferred is a 3-sulfopropoxy group. A preferred substituent number is 1 or 2, and preferred is the 4-position alone, a combination of the 2-position and 4-position, or a combination of the 3-position and 5-position, but not particularly limited thereto. When $A_1$ is a naphthyl group having a substituent, it preferably has at least one sulfo group as a substituent, whereas, when it has two or more substituents, it is preferable that at least one of substitution position of the sulfo groups. When the substituent number of the sulfo groups is 3, the combination of the 1-, 3-, and 6-positions is particularly preferable as the substitution position of the sulfo groups.

As an amino group that may have a substituent for $X_1$, a benzoyl amino group that may have a substituent, a phenyl amino group that may have a substituent, and a phenylazo group that may have a substituent are included. Preferred is a phenyl amino group having any one or two substituents of a hydrogen atom, a methyl group, a methoxy group, a sulfo group, an amino group, or a lower alkyl amino group; or a benzoyl amino group having any one substituent of a hydrogen atom, a hydroxy group, an amino group, or a carboxyethyl amino group; or a phenylazo group having any one-to three substituents of an hydrogen atom, a hydroxy group, an alkyl group with a carbon number of 1 to 4, an alkoxy group with a carbon number of 1 to 4, an amino group, or a carboxyethyl amino group. Preferred is a benzoyl amino group that may have a substituent, or a phenyl amino group that may have a substituent. Particularly preferred is a phenyl amino group. The substitution position is not limited, but when there is one substituent, the p-position is particularly preferable.

$R_1$ to $R_4$ each independently represent a hydrogen atom, a lower alkyl group, a lower alkoxy group, or a lower alkoxy group having a sulfo group. More preferred is a hydrogen atom, a lower alkyl group, or a lower alkoxy group, and further preferred is a hydrogen atom, a methyl group, or a methoxy group. A straight chain alkoxy group is preferable as a lower alkoxy group having a sulfo group, the terminal of an alkoxy group is preferable as the substitution position of the sulfo group. More preferred is a 3-sulfopropoxy group or a 4-sulfobutoxy group, and particularly preferred is a 3-sulfopropoxy group.

Formula (2)

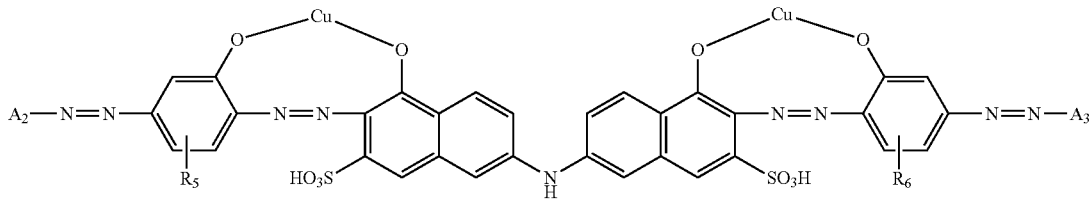

Wherein, $A_2$ and $A_3$ each independently represent a naphthyl group or a phenyl group having at least one of the substituent being a hydrogen atom, a sulfo group, a lower alkyl group, a lower alkoxy group, a lower alkoxy group having a sulfo group, a carboxy group, a nitro group, an amino group, or a substituted amino group, and $R_5$ and $R_6$ each independently represent a hydrogen atom, a lower alkyl group, a lower alkoxy group, a sulfo group, or a lower alkoxy group having a sulfo group.

$A_2$ and $A_3$ in formula (2) are each preferably a phenyl group or a naphthyl group having two or more sulfo groups or carboxy groups, more preferably a naphthyl group. $R_5$ and $R_6$ in formula (2) are preferably a methyl group. It is preferable for $A_2$, $A_3$, $R_5$ and $R_6$ to use such substituents because a polarizing element or a polarizing plate having a further high degree of polarization can be obtained.

By adjusting the polarizing elements which have azo compounds represented by formula (1) and formula (2) or salts thereof such that the absolute value of the difference between the average transmittance at 420 nm to 480 nm and the average transmittance at 520 nm to 590 nm is equal to or less than 2.5 and the absolute value of the difference between the average transmittance at 520 nm to 590 nm and the average transmittance at 590 nm to 640 nm is equal to or less than 2.0, it has been realized that the polarizing elements can express a high grade paper-like white in the parallel position while having a high degree of polarization. Further, an achromatic property via a single plate has been realized while having high transmittance; and the polarizing elements or polarizing plates further having high durability were obtained. 420 nm to 480 nm, 520 nm to 590 nm, and 590 nm to 640 nm are main wavelength bands based on the color-matching function used when colors are indicted in JIS Z 8729. Specifically, in the XYZ color-matching function in JIS Z 8701, which is the origin of JIS Z 8729, when the respective largest values of x (λ) with a largest value of 600 nm, y (λ) with a largest value of 500 nm, and z (λ) with a largest value of 455 nm are defined as 100, respective wavelengths indicating a value greater than or equal to 20 are wavelengths at 420 nm to 480 nm, 520 nm to 590 nm, and 590 nm to 640 nm, respectively. The polarizing elements or polarizing plates according to the present invention can be obtained by adjusting the transmittances of these respective wavelengths to a certain transmittance. Therefore, for the respective wavelength transmittances obtained using two of the polarizing elements or polarizing plates in which their absorption axes are positioned in parallel, it is necessary that the absolute value of the difference between the average transmittance at 420 nm to 480 nm and the average transmittance at 520 nm to 590 nm should be equal to or less than 2.5%, preferably equal to or less than 1.8%, more preferably equal to or less than 1.5%, and further preferably equal to or less than 1.0%. For each wavelength transmittance obtained using two of the polarizing elements or polarizing plates in which their absorption axes are positioned in parallel, it is necessary that the absolute value of the difference between the average transmittance 520 nm to 590 nm and the average transmittance at 590 nm to 640 nm should be equal to or less than 2.0%, preferably equal to or less than 1.5%, and more preferably equal to or less than 1.0%. It is necessary that the absolute value of the difference between the average transmittance at 420 nm to 480 nm and the average transmittance at 520 nm to 590 nm should be equal to or less than 2.5%, and the absolute value of the difference between the average transmittance at 520 nm to 590 nm and the average transmittance at 590 nm to 640 nm should be equal to or less than 2.0%; it is preferable that the absolute value of the difference between the average transmittance at 420 nm to 480 nm and the average transmittance at 520 nm to 590 nm is equal to or less than 1.8% and the absolute value of the difference between the average transmittance at 520 nm to 590 nm and the average transmittance at 590 nm to 640 nm is equal to or less than 1.5%, it is more preferable that the absolute value of the difference between the average transmittance at 420 nm to 480 nm and the average transmittance at 520 nm to 590 nm is equal to or less than 1.0% and the absolute value of the difference between the average transmittance at 520 nm to 590 nm and the average transmittance at 590 nm to 640 nm is equal to or less than 1.0%.

A substrate according to the present invention is formed by a hydrophilic polymer that may comprise azo compounds, particularly common dichroism dyes. Although the hydrophilic polymer is not particularly limited, for example, it may include a polyvinyl alcohol resin, an amylose resin, a starch resin, a cellulose resin, a polyacrylic resin, etc. When it comprises a dichroic pigment, a polyvinyl alcohol resin or a resin made of a derivant thereof is most preferable in terms of workability, stainability, cross-link properties, etc. The polarizing elements or polarizing plates can be created by making these resins into a film shape, allowing the dyes of the present invention and the formulation thereof to be contained therein, and applying orientation treatments such as drawing, etc. thereto.

By adjusting value a* and value b* obtained in accordance with JIS Z 8701 or JIS Z 8729 such that the absolute values of value a* and value b* when a single body transmittance is measured are equal to or less than 1, and the absolute values of value a* and value b* obtained using two of the polarizing elements in which their absorption axes are positioned in parallel are equal to or less than 2, the polarizing elements or polarizing plates which have a neutral color as a single body and which can express a high-grade white in the parallel position can be created. The display method of an object color determined by JIS Z 8729 corresponds to the display method of an object color determined by the International Commission on Illumination (abbreviated as CIE). A single body transmittance represents a transmittance obtained by measuring the transmittance of one (a single body) polarizing element when natural light irradiated thereto. In a color phase when the single body transmittance is measured, the absolute values of value a* (hereinafter, referred to as a*-s) and value b* (hereinafter, referred to as b*-s) are preferably equal to or less than 1. The absolute values of value a* (hereinafter, referred to as a*-p) and value b* (hereinafter, referred to as b*-p) obtained using two of the polarizing elements or polarizing plates in which their absorption axes are positioned in parallel when natural lights is irradiated are preferably equal to or less than 2. More preferably, the absolute values of a*-p and b*-p are equal to or less than 1.5, further preferably, the absolute values of a*-p and b*-p are equal to or less than 1.0. It is very important to control these values, because some people sense color differences even when there is only a difference in absolute value of 0.5 between a*-p and b*-p, depending on their sensitivity. Particularly, if the absolute values of a*-p and b*-p are equal to or less than 1, the polarizing plate is excellent so that it is difficult to confirm any coloration of the polarizing plate expresses in white display.

Regarding the performance of a polarizing plate, higher transmittance is desired. A polarizing plate with a single body transmittance between 35% and 60% can naturally express brightness without a sense of discomfort when used for displays. Preferred is between 36% and 55%, and more preferred is between 37% and 55%. A polarizing plate with a single body transmittance of greater than or equal to 60% can achieve a high neutral color while a high transmittance; however, this is not preferable because the degree of polarization is markedly lowered.

Further, regarding the transmittance to be provided to a display, the average transmittance at each wavelength of 520 nm to 590 nm obtained using two of the polarizing elements or polarizing plates in which their absorption axes are positioned in parallel should be between 25% and 55%, in order a clear, bright, and sharp display. 520 nm to 590 nm is the main wavelength band based on the color-matching function thereof to be used for calculation when colors are indicated in JIS Z 8729. Particularly, 520 nm to 590 nm is a wavelength with high visibility based on the color-matching function. It is very important to adjust the transmittance at each wavelength of 520 nm to 590 nm since the transmittance within this range is close to the transmittance that can be visibly confirmed. It is important to control the transmittance to between 25% and 55%.The average transmittance at each wavelength of 520 nm to 590 nm obtained using two of the polarizing elements or polarizing plates in which their absorption axes are positioned in parallel is desirably between 25% and 55%. The preferable range is between 27% and 45%, more preferably between 28% and 40%. In this case, a degree of polarization between 50% and 100% is desirable, preferably between 60% and 100%, and more preferably between 70% and 100%. A higher degree of polarization is preferable. It is preferable to select a suitable polarizing element depending on whether brightness is stressed or the degree of polarization (contrast) is stressed in the relation between the degree of polarization and transmittance.

In order to ensure that polarizing elements express a neutral color, so-called "Neutral Gray", while having a higher single body transmittance, can express a high grade paper-like white using the polarizing elements in which the absorption axes are positioned in parallel, and have a high degree of polarization and high durability, while having a higher single body transmittance, the polarizing elements comprise at least two azo compounds or salts thereof represented by formula (1) It is preferable that k in formula (1) is 0, namely, an azo compound represented by formula (3) or a salt thereof as one of the two azo compounds or salts thereof and that k in formula (1) is 1, namely, the azo compound represented by formula (4) or a salt thereof as the other one.

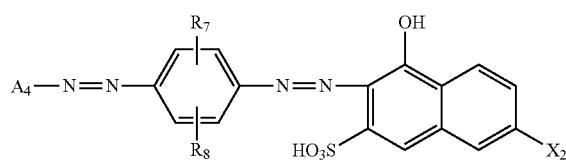

Formula (3)

Wherein, $A_4$ represents a phenyl group or a naphthyl group having a substituent. The preferable substituent is the same as one for $A_1$ in formula (1)A phenyl group is preferable. $R_7$ and $R_8$ each independently represent a substituent similar to $R_1$ and $R_2$ in formula (1), are preferably a hydrogen atom, a lower alkyl group, or a lower alkoxy group, and are more preferably a hydrogen atom, a methyl group, or a methoxy group. It is preferable that $X_2$ is a phenyl amino group with a substituent having any one or two of a hydrogen atom, a methyl group, a methoxy group, a sulfo group, an amino group, or a lower alkyl amino group; or a benzoyl amino group with a substituent having any one of a hydrogen atom, a hydroxy group, an amino group, or a carboxyethyl amino group. Most preferred is a phenyl amino group with a substituent having any one or two of a hydrogen atom, a methyl group, a methoxy group, a sulfo group, an amino group, or a lower alkyl amino group. It is preferable to adopt the above-mentioned preferable designs because high contrast polarizing elements or polarizing plates that can express a high grade paper-like white at higher parallel positions can be obtained.

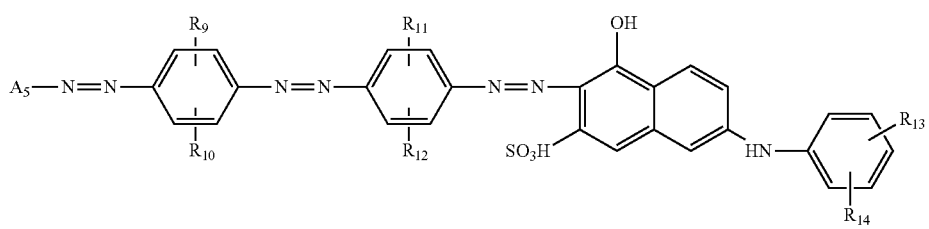

Formula (4)

Wherein, $A_5$ represents a phenyl group or a naphthyl group having a substituent. The preferable substituent is the same as one for $A_1$ in formula (1). A phenyl group having a substituent is preferable. Particularly preferred is a phenyl group having any substituent from among a methyl group, a methoxy group, a sulfo group, an amino group, or a benzoyl group. $R_9$ to $R_{12}$ each independently are the same substituent as $R_1$ to $R_4$ in formula (1), are preferably a hydrogen atom, a lower alkyl group, or a lower alkoxy group, and are more preferably a hydrogen atom, a methyl group, or a methoxy group, except that all of $R_9$ to $R_{12}$ are simultaneously lower alkoxy groups. $R_{13}$ and $R_{14}$ each independently represent any of a hydrogen atom, a methyl group, a methoxy group, a sulfo group, an amino group or an amino group having a substituent, are preferably any of a hydrogen atom, a methyl group, a methoxy group, a sulfo group, or an amino group, and are particularly preferably a hydrogen atom, a methoxy group, or an amino group. At least one of $R_{11}$ and $R_{12}$ in formula (4) is preferably a methoxy group; further, at least one of $R_9$ and $R_{10}$ in formula (4) is preferably a methoxy group. These are preferable because high contrast polarizing elements or polarizing plates that can express a high grade paper-like white at the higher parallel position can be obtained.

Using azo compounds represented by formula (3) and formula (4) or salts thereof along with formula (2), polarizing elements can be obtained, that express a neutral color (neutral gray) at a more single body transmittance between 35% and 60%, express a high grade paper-like white using the polarizing elements with the absorption axes positioned in parallel, and further, have a higher degree of polarization and high durability. Further, a polarizing plate formed from the azo compounds represented by formulas (1) to (4) or salts thereof is advantageous in that little heat is generated even if light such as sunlight is irradiated, because the absorption of light greater than or equal to 700 nm is extremely less. For example, when a liquid crystal display is used outdoors, etc., sunlight is irradiated onto the liquid crystal display and this light is necessarily irradiated onto the polarizing plate. The light also includes light with wavelengths at greater than or equal to 700 nm, which corresponds to near infrared rays and thus is heatgenerating light. For example, if the azo compounds of Example 3 in JP H02-061988 B are utilized, they only slightly absorb near infrared rays to generate heat since they absorb near infrared light around 700 nm; however, the polarizing plate according to the present invention is excellent in that little heat is generated even if it is exposed outdoors because the absorption thereof can be minimized. The present invention is excellent in that there is little degradation of the polarizing plate since little heat is generated therefrom.

Further, in order to improve performance, an azo compound represented by formula (5) or a salt thereof is preferably comprised in addition to azo compounds represented by formulas (1) to (4) or salts thereof. It is preferable that an azo compound represented by formula (5) or a salt thereof is comprised, because more neutral colors is expressed at a single body transmittance between 35% and 60%, a higher grade paper-like white is expressed using the polarizing elements with the absorption axes positioned in parallel, also the degree of polarization is improved. The azo compounds represented by formula (5) or salts thereof affect transmittance at 400 and 500 nm. Regarding the polarizing elements or polarizing plates, particularly, the transmittance and degree of polarization (dichroism) at short wavelengths of 400 and 500 nm greatly affect the absence of a blue and yellow tinge when they indicate colors. The polarizing elements or polarizing plate preferably do not express a yellow tinge when indicating white because people generally get the impression that the polarizing elements or polarizing plate have degraded and dislike such polarizing elements or polarizing plates. Moreover, it cannot be said that the absence of blue when black is indicated is preferable because people may get the impression that unclear black lacks high-quality. Formula (5) is preferably utilized in order to decrease the yellow tinge and absence of blue as much as possible, in other words, in order to improve the polarization properties (dichroism) at 400 and 500 nm without lowering transmittance on the short wavelength side in the parallel position.

Formula (5)

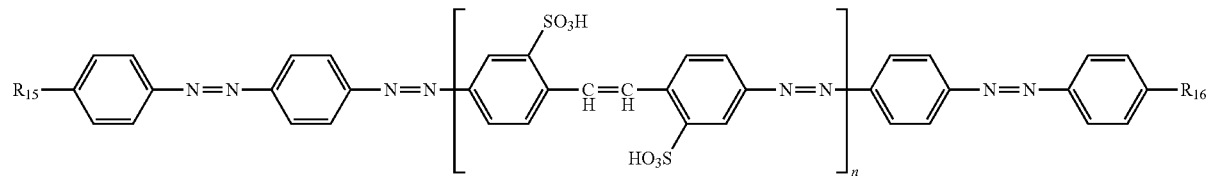

Wherein, $R_{15}$ and $R_{16}$ each independently represent any of a sulfo group, a carboxy group, a hydroxy group, a lower alkyl group, or a lower alkoxyl group, and n represents an integer from 1 to 3. $R_{15}$ and $R_{16}$ are preferably a sulfo group and a carboxy group.

In order to obtain a polarizing element that expresses achromatic properties, namely, a high grade paper-like white in the more parallel position, has achromatic properties and a high degree of polarization even at high contrast and high transmittance, and has high durability thereby to obtain the polarizing elements or polarizing plates of the present invention, azo compounds are used in a combination of formula (1) to formula (4), formula (1) to formula (5), or formula (2) to formula (5), and further, the transmittance at respective wavelengths to a predetermined transmittance is adjusted.

In order to obtain a polarizing element that expresses achromatic properties, namely, a high grade paper-like white in the parallel position, has achromatic properties and a high degree of polarization as a single body even at high contrast and high transmittance, and has high durability, wherein the polarizing element realizes a higher contrast, and further, provides a clear black color with high-quality, it is necessary to realize achromatic black in the orthogonal position. If achromatic black becomes sharp, clear character recognition, etc. can be made to provide high-quality. The combination of formula (1) and formula (2) according to the present invention, the combination of formula (2), formula (3), and formula (4) according to the present invention, the combination of formula (1), formula (2), and formula (5) according to the present invention, and the combination of formula (2), formula (3), formula (4), and formula (5)

according to the present invention can express achromatic properties, namely, a high grade paper-like white in the parallel position, have achromatic properties and a high degree of polarization as a single body even at high contrast and high transmittance, have high durability, and express achromatic black. In order to realize such polarizing plates, the formulation thereof is necessarily adjusted as follows:
in each wavelength transmittance obtained using two of the polarizing elements or polarizing plates in which their absorption axes are positioned in parallel,
the average transmittance at 520 nm to 590 nm is between 25% and 55%,
the absolute value of the difference between the average transmittance at 420 nm to 480 nm and the average transmittance at 520 nm to 590 nm is equal to or less than 2.5%, and
the absolute value of the difference between the average transmittance at 520 nm to 590 nm and the average transmittance at 590 nm to 640 nm is equal to or less than 2.0%;
further, in each wavelength transmittance obtained using two of the polarizing element or polarizing plate in which their absorption axes are positioned orthogonally,
the absolute value of the difference between the average transmittance at 420 nm to 480 nm and the average transmittance at 520 nm to 590 nm is equal to or less than 0.3%, and
the absolute value of the difference between the average transmittance at 520 nm to 590 nm and the average transmittance at 600 nm to 640 nm is equal to or less than 0.3%.

Using an azo compound group in any combination of formula (1) to formula (4), formula (1) to formula (5), or formula (2) to formula (5), the present transmittance can be adjusted, after which it is then possible to express achromatic properties, namely, a high grade paper-like white in the parallel position, have achromatic properties and a high degree of polarization as a single body even at high contrast and high transmittance, have high durability, and express achromatic black.

In each wavelength transmittance obtained using two of the polarizing elements or polarizing plates in which their absorption axes are positioned orthogonally,
it is necessary that the absolute value of the difference between the average transmittance at 420 nm to 480 nm and the average transmittance at 520 nm to 590 nm should be equal to or less than 0.3%, preferably equal to or less than 0.2%, more preferably equal to or less than 0.1%. Further, it is necessary that the absolute value of the difference between the average transmittance at 520 nm to 590 nm and the average transmittance at 590 nm to 640 nm should be equal to or less than 0.3%, preferably equal to or less than 0.2%, more preferably equal to or less than 0.1%.

More specifically,
in each wavelength transmittance obtained using two of the polarizing elements or polarizing plates in which their absorption axes are positioned in parallel, it is necessary that the absolute value of the difference between the average transmittance at 420 nm to 480 nm and the average transmittance at 520 nm to 590 nm should be equal to or less than 2.5%, and the absolute value of the difference between the average transmittance at 520 nm to 590 nm and the average transmittance at 590 nm to 640 nm is equal to or less than 2.0%.

In each wavelength transmittance obtained using two of the polarizing elements or polarizing plates in which their absorption axes are positioned orthogonally, it is necessary that the absolute value of the difference between the average transmittance at 420 nm to 480 nm and the average transmittance at 520 nm to 590 nm should be equal to or less than 0.3%, and the absolute value of the difference between the average transmittance at 520 nm to 590 nm and the average transmittance at 590 nm to 640 nm is equal to or less than 0.3%.

Preferably, in each wavelength transmittance obtained using two of the polarizing elements or polarizing plates in which their absorption axes are positioned in parallel, the absolute value of the difference between the average transmittance at 420 nm to 480 nm and the average transmittance at 520 nm to 590 nm is equal to or less than 1.8% and the absolute value of the difference between the average transmittance at 520 nm to 590 nm and the average transmittance at 590 nm to 640 nm is equal to or less than 1.5%, and in each wavelength transmittance obtained using two of the polarizing elements or polarizing plates in which their absorption axes are positioned orthogonally, the absolute value of the difference between the average transmittance at 420 nm to 480 nm and the average transmittance at 520 nm to 590 nm is equal to or less than 0.2% and the absolute value of the difference between the average transmittance at 520 nm to 590 nm and the average transmittance at 590 nm to 640 nm is equal to or less than 0.2%.

More preferably, in each wavelength transmittance obtained using two of the polarizing elements or polarizing plates in which their absorption axes are positioned in parallel, the absolute value of the difference between the average transmittance at 420 nm to 480 nm and the average transmittance at 520 nm to 590 nm is equal to or less than 1.0% and the absolute value of the difference between the average transmittance at 520 nm to 590 nm and the average transmittance at 590 nm to 640 nm is equal to or less than 1.0%, and in each wavelength transmittance obtained using two of the polarizing elements or polarizing plates in which their absorption axes are positioned orthogonally, the absolute value of the difference between the average transmittance at 420 nm to 480 nm and the average transmittance at 520 nm to 590 nm is equal to or less than 0.1% and the absolute value of the difference between the average transmittance at 520 nm to 590 nm and the average transmittance at 590 nm to 640 nm is equal to or less than 0.1%.

In order to obtain a polarizing element that expresses achromatic properties, namely, a high grade paper-like white in the parallel position, has achromatic properties and a high degree of polarization as a single body even at high contrast and high transmittance, and has high durability, wherein the polarizing element realizes a higher contrast, regarding adjustment of the transmittance for realizing achromatic black in the orthogonal position, in value a* and value b* specifically obtained in accordance with JIS Z 8729,
the absolute values of a*–s and b*–s are preferably equal to or less than an absolute value of 1, a*–p and value b* are preferably equal to or less than 2, and the absolute values of value a* (hereinafter, referred to as a*–c) and value b* (hereinafter, referred to as b*–c), which are the values of the color phase obtained using two of the polarizing elements or polarizing plates in which their absorption axes are positioned orthogonally when natural light enters, are preferably equal to or less than 2.
More preferably, the absolute values of a*–s and b*–s are equal to or less than 1, the absolute values of a*–p and b*–p are equal to or less than 1.5, and the absolute values of a*–c and b*–c are equal to or less than 1.5,
further preferably, the absolute values of a*–s and b*–s are equal to or less than 1, the absolute values of a*–p and b*–p are equal to or less than 1.0, and the absolute values of a*–c and b*–c are equal to or less than 1.0.

Since some people largely sense color differences even when there is only a difference in absolute value of 0.5 depending on their sensitivity, it is very important to control the present value. Particularly, if each of the absolute values of a*–p, b*–p, a*–c, and b*–c are equal to or less than 1, the more difficult it is to confirm that the polarizing plate expresses some colors in white display and black display, the more excellent the polarizing plate. According to this control, a polarizing element that expresses achromatic properties, namely, a high grade paper-like white in the parallel position, has achromatic properties and a high degree of polarization as a single body even at high contrast and high transmittance, and has high durability can be obtained to realize achromatic black in the orthogonal position while realizing higher contrast.

On the other hand, adjustment of the average transmittance at 380 nm to 420 nm, 480 nm to 520 nm, and 640 nm to 780 nm is necessary; however, since the average transmittance at 420 nm to 480 nm, at 520 nm to 590 nm, and at 600 nm to 640 nm is adjusted, the average transmittance is not affected much by pigments. However, some adjustments are necessary, and the average transmittance is preferably adjusted such that the difference between the average value of the transmittance at 380 nm to 420 nm and the average value of the transmittance at 420 nm to 480 nm is equal to or less than 15%, while the difference between the average transmittance at 480 nm to 520 nm and the average value between the average transmittance at 420 nm to 480 nm and the average transmittance between 520 nm to 590 nm is equal to or less than 15%, and the difference between the average transmittance at 640 nm to 780 nm and the average transmittance at 600 nm to 640 nm is equal to or less than 20%.

As a method of obtaining azo compounds with k=0 in formula (1), namely, the azo compounds represented by formula (3), the methods described in JP 2003-215338 A, JP H9-302250 A, JP 3881175 B, etc. are listed but not limited thereto.

As a method of obtaining azo compounds with k=1 in formula (1), namely, the azo compounds represented by formula (4), the methods described in JP 4452237 B, JP 4662853 B, JP H03-012606 A, JP H05-295281 A, etc. are listed but not limited thereto.

As a method of obtaining the azo compound represented by formula (2) or a salt thereof, for example, the methods described in WO2012/165223, etc. are listed but not limited thereto.

As a method of obtaining the azo compound represented by formula (5) or a salt thereof, for example, the methods described in WO2007/138980, etc. are listed but not limited thereto.

Specific examples of the azo compounds with k=0 in formula (1), namely, the azo compounds represented by formula (3), include C. I. Direct Red 81, C. I. Direct Red 117, C. I. Direct Violet 9, C. I. Drect Red 127, and the compounds described in JP 2003-215338 A, JP H9-302250 A, JP 3881175 B, etc. are listed. More specifically, specific examples of azo compounds with k=0 in formula (1), namely, the azo compounds represented by formula (3), are represented as follows in the form of free acid.

[Compound Example 1]

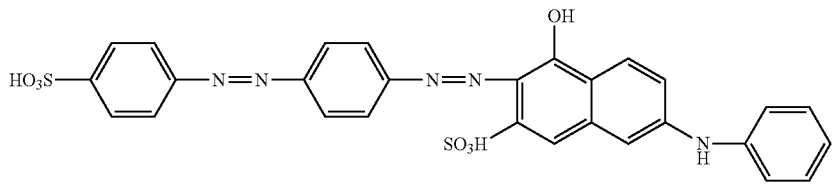

[Compound Example 2]

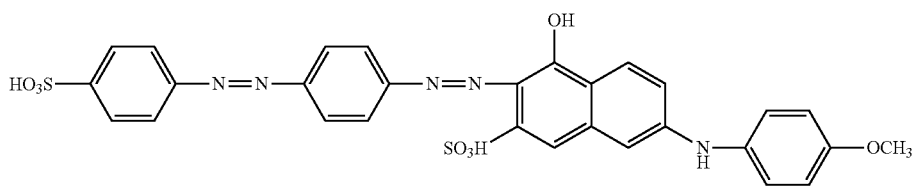

[Compound Example 3]

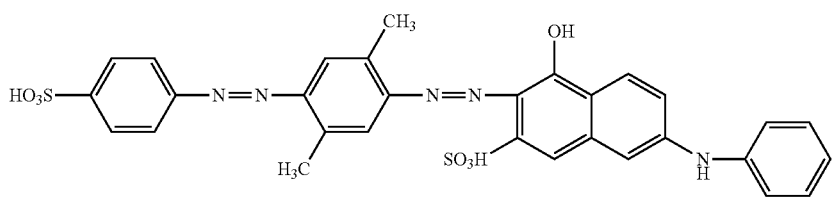

[Compound Example 4]

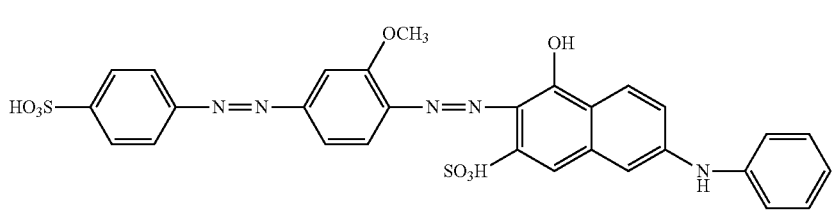

[Compound Example 5]

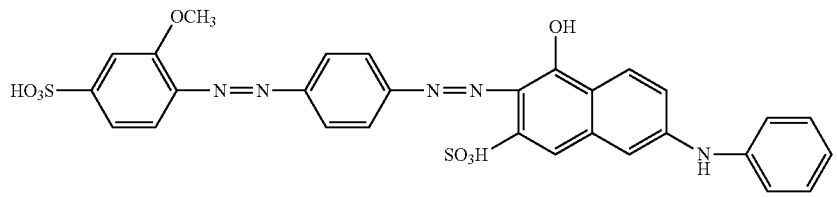

[Compound Example 6]

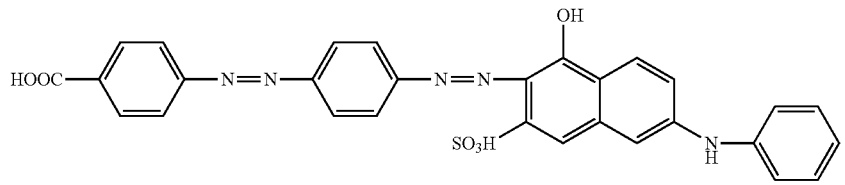

[Compound Example 7]

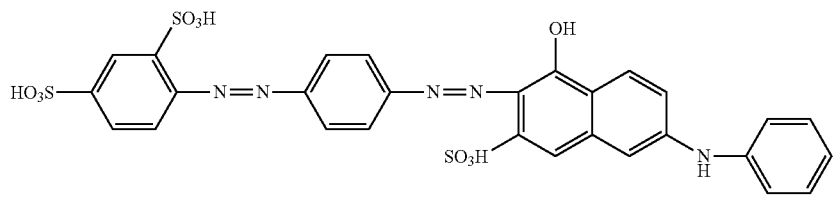

[Compound Example 8]

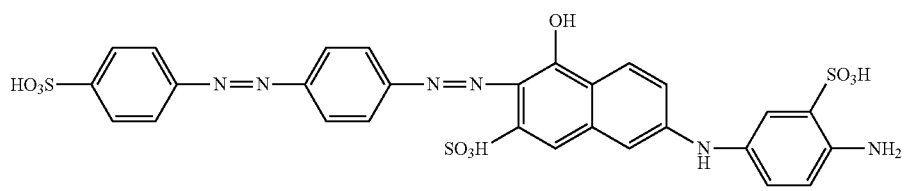

[Compound Example 9]

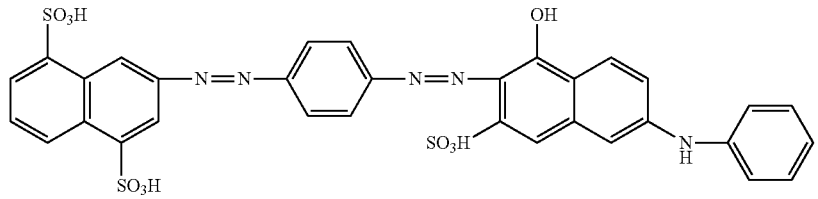

[Compound Example 10]

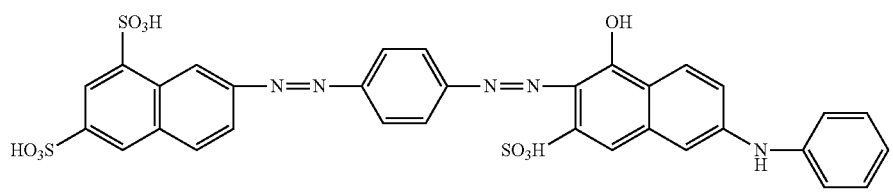

Specific examples of the azo compounds with k=1 in formula (1), namely, the azo compounds represented by formula (4), are listed. Specifically, the azo compounds described in JP 4452237 B, JP 4662853 B, JP 4815721 B, JP H03-012606 A, JP H05-295281 A, JP 2622748 B, etc. are listed. More specifically, specific examples of the azo compounds with k=1 in formula (1), namely, the azo compounds represented by formula (4), are represented as follows in the form of free acid.

[Compound Example 11]

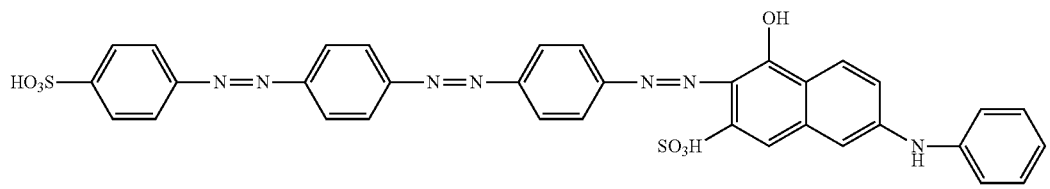

-continued
[Compound Example 12]
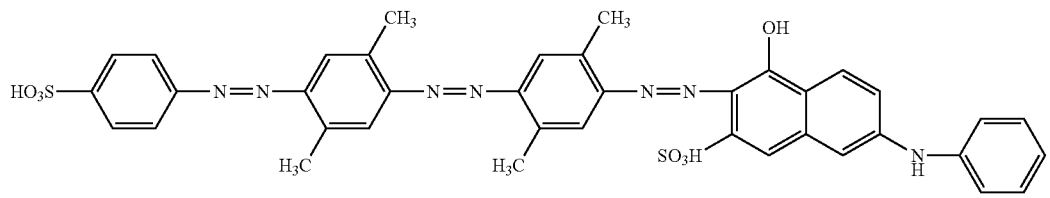
[Compound Example 13]
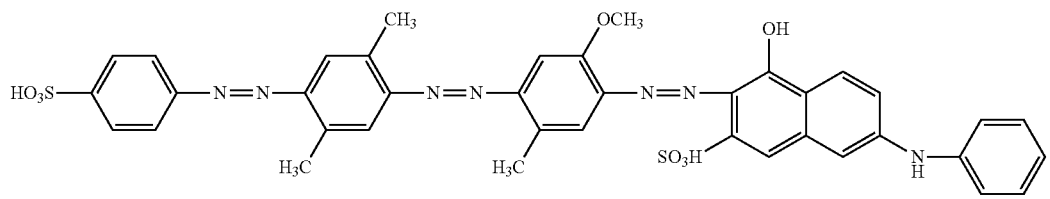
[Compound Example 14]
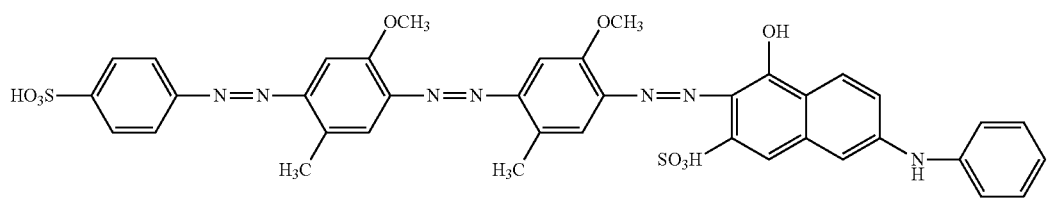
[Compound Example 15]
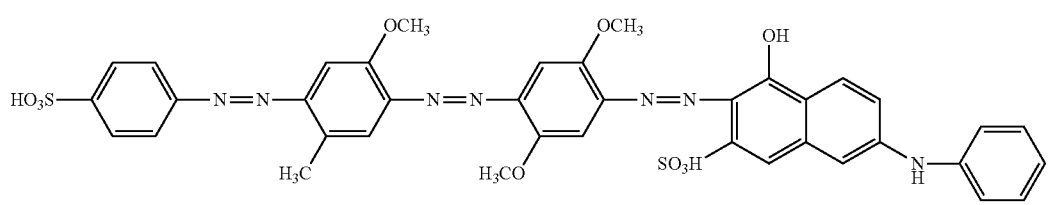
[Compound Example 16]
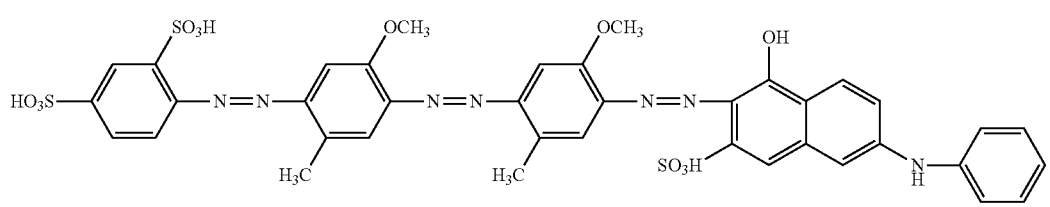
[Compound Example 17]
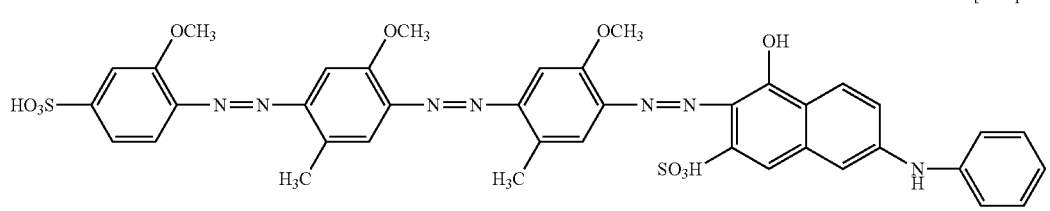
[Compound Example 18]
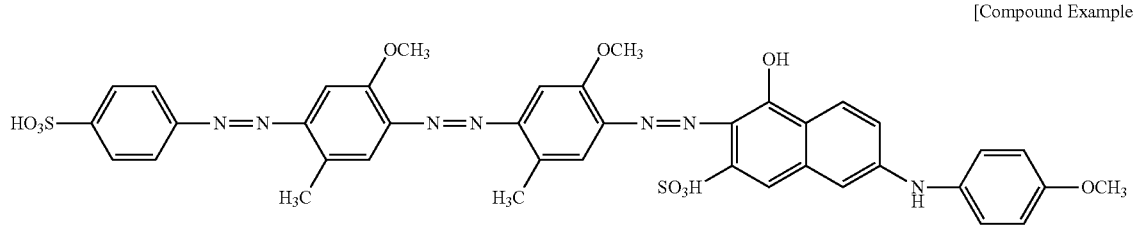

[Compound Example 19]
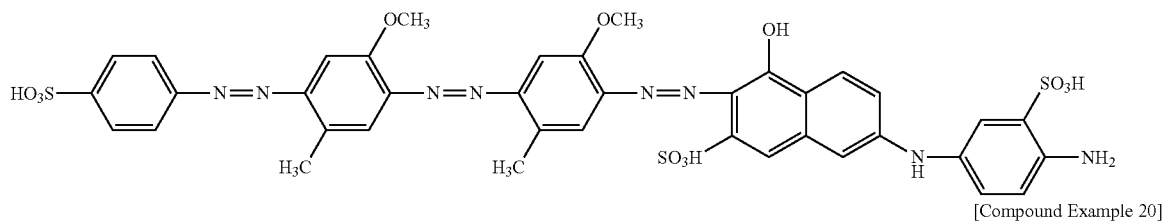
[Compound Example 20]
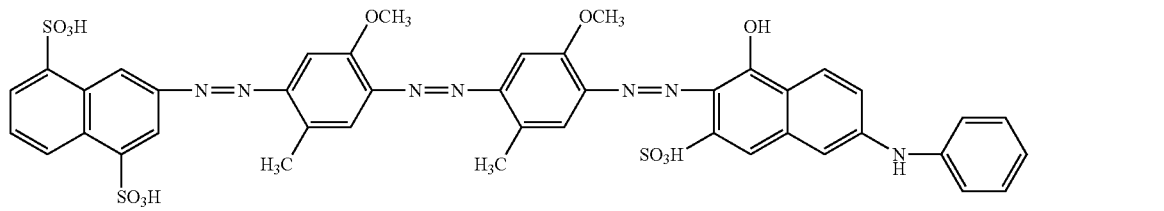
[Compound Example 21]
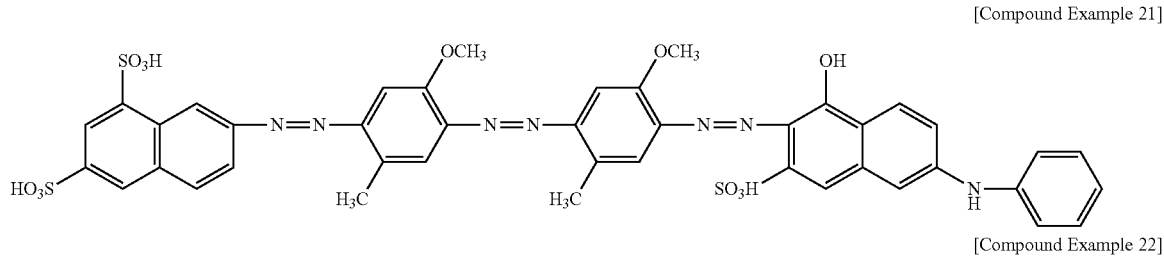
[Compound Example 22]
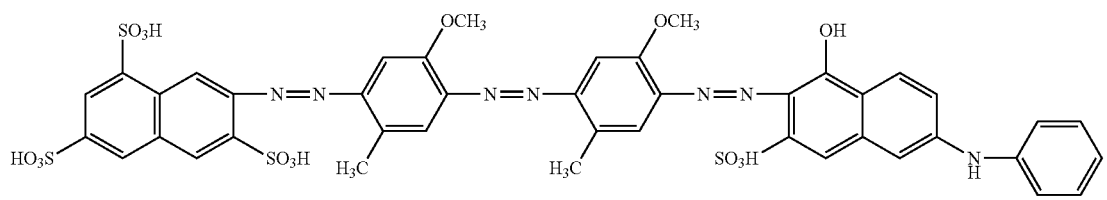
Specific examples of the azo compounds represented by formula (2) are represented as follows in the form of free acid.
[Compound Example 23]
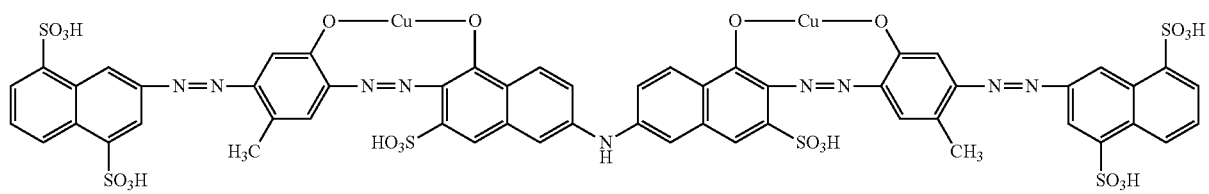
[Compound Example 24]
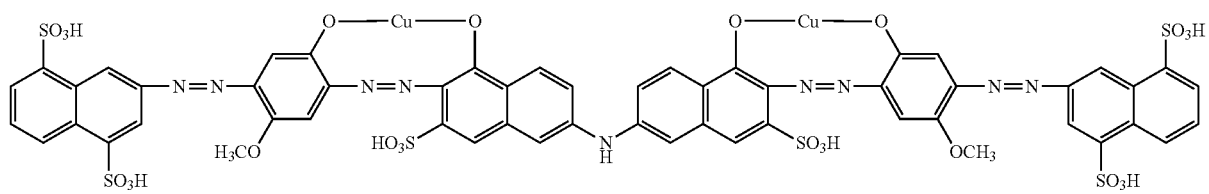

[Compound Example 25]

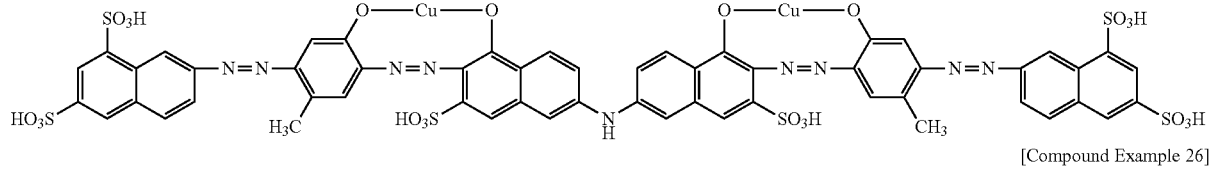

[Compound Example 26]

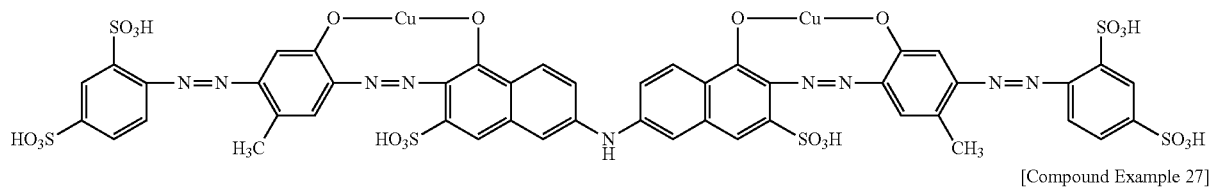

[Compound Example 27]

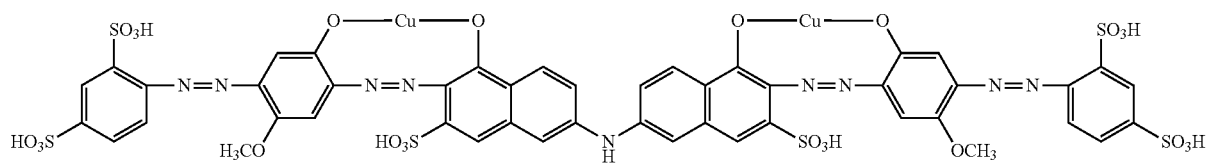

The azo compounds represented by formula (5) include, for example, azo compounds having a stilbene structure such as the dyes described in C. I. Direct Yellow 4, C. I. Direct Yellow 12, C. I. Direct Yellow 72, C. I. Direct Orenge 39, WO2007/138980, etc. but not limited thereto. Specific examples of the azo compounds used for the present invention represented by formula (5) are illustrated below. The compound examples are represented in the form of free acid.

Hereinafter, a specific production method of a polarizing element will be explained taking a polyvinyl alcohol resin film as a sample substrate. The production method of polyvinyl alcohol resin is not particularly limited, with the polyvinyl alcohol resin capable of being created according to any publicly known method. According to the production method, for example, a polyvinyl alcohol resin can be obtained by saponifying a polyvinyl acetate resin. As a

[Compound Example 28]

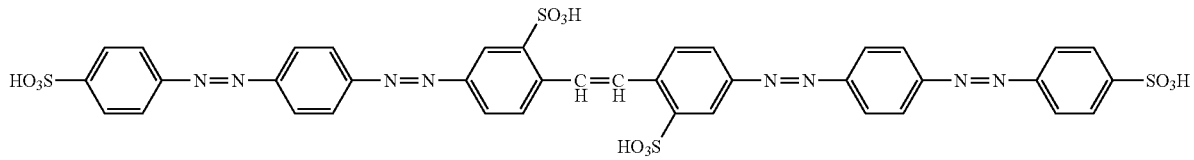

[Compound Example 29]

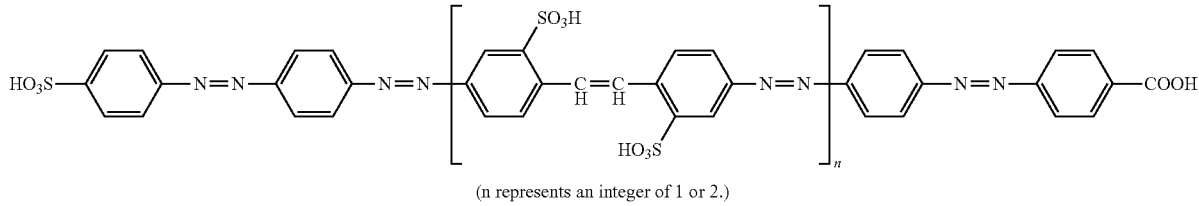

(n represents an integer of 1 or 2.)

[Compound Example 30]

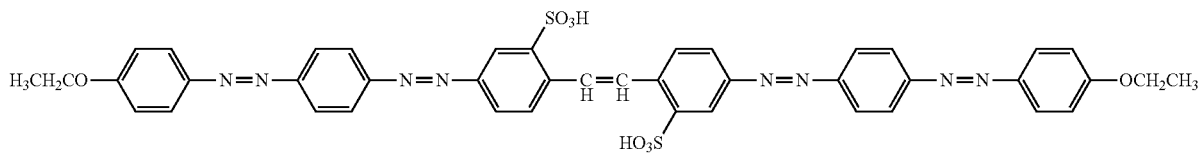

[Compound Example 31]

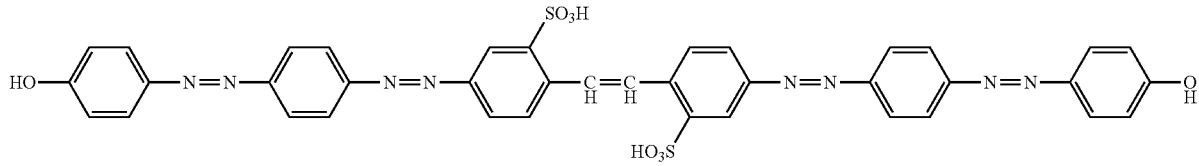

polyvinyl acetate resin, vinyl acetate and other monomer copolymers that can be copolymerized to vinyl acetate are exemplified, with the exception of polyvinyl acetate, which is a homopolymer of vinyl acetate. As another monomer copolymerized to vinyl acetate, for example, unsaturated carboxylic acid, olefin, vinyl ether, unsaturated sulfonic acid, etc. are listed. The degree of saponification of a polyvinyl alcohol resin is normally approximately 85 to 100 mol %, preferably greater than or equal to 95 mol %. This polyvinyl alcohol resin may be further modified; for example, polyvinyl formal and polyvinyl acetal modified by aldehyde may also be used. Moreover, the degree of polymerization of a polyvinyl alcohol resin means the viscosity-average polymerization degree, which can be obtained by any well-known method in the present technical field. It is normally a degree of polymerization of about 1,000 to 10,000, preferably a degree of polymerization of about 1,500 to 6,000.

The film formed by such a polyvinyl alcohol resin is utilized as web film. The method of forming polyvinyl alcohol resin is not particularly limited, with the polyvinyl alcohol resin capable of being formed by any publicly-known method. In this case, the polyvinyl alcohol resin film may comprise glycerin, ethylene glycol, propylene glycol, low-molecular-weight polyethylene glycol, etc. as a plasticizer. The plasticizer amount is 5 to 20 wt %, preferably 8 to 15 wt %. The film thickness of the web film formed by the polyvinyl alcohol resin is not particularly limited. For example, it is approximately 5 μm to 150 μm, preferably approximately 10 μm to 100 μm.

Subsequently, the web film obtained as described above includes a swelling step. The swelling treatment is applied by immersing the web film in a solution at a temperature of 20 to 50° C. for 30 seconds to 10 minutes. The solution is preferably water. The draw ratio is desirably adjusted at 1.00 to 1.50-fold, preferably at 1.10 to 1.35-fold. When shortening the time in order to create polarization element films, since the web film is also immersed during the dyeing treatment of pigment, the swelling treatment may be omitted.

The swelling step is carried out by immersing a polyvinyl alcohol resin film in a solution at 20 to 50° C. for 30 seconds to 10 minutes. The solution is preferably water. When shortening the time in order to create polarizing elements, the swelling step may be omitted since the web film is also immersed during the dyeing treatment of pigment.

The dyeing step is provided after the swelling step. In the dyeing step, the azo compounds represented by formula (1), formula (2), formula (3), formula (4), and formula (5) or salts thereof, namely, pigments, can be absorbed onto a polyvinyl alcohol film to be impregnated. This step of impregnating azo compounds is defined as the dyeing step since the film is pigmented. The dyeing step is not particularly limited as long as it is a method of absorbing pigments on the polyvinyl alcohol film and impregnating it. For example, the dyeing step is carried out by immersing the polyvinyl alcohol resin film in a solution comprising a dichroism dye. In this step, the temperature of the solution is preferably 5 to 60° C., more preferably 20 to 50° C., and particularly preferably 35 to 50° C. The time of immersion in a solution can be appropriately adjusted. It is preferably 30 seconds to 20 minutes, more preferably 1 to 10 minutes. As a dyeing method, immersion in the solution is preferable; however, the dyeing can be carried out also by applying the solution onto the polyvinyl alcohol resin film. A solution comprising a dichroism dye may comprise sodium carbonate, sodium hydrogen carbonate, sodium chloride, sodium sulfate, anhydrous sodium sulfate, sodium tripolyphosphate, etc. as a dyeing aid. The contents thereof can be adjusted by time and temperature at any density depending on the stainability of the dye, and 0 to 5 weight % is preferable, and 0.1 to 2 weight % regarding the content of each. The azo compounds that are dichroism dyes described in NON PATENT DOCUMENT 1, the azo compounds represented by formula (1), formula (2), formula (3), formula (4), formula (5), etc. may be used as salts of the present compound in addition to being used as free acids. Such salts including lithium salt, sodium salt, alkali metal salts such as calcium salt, or organic salts such as ammonium salt or alkylamine salt can also be used. Sodium salt is preferable. Polarizing elements comprising the azo compounds represented by formula (1), formula (2), formula (3), formula (4), and formula (5) or salts thereof are preferable according to the present invention; however, the colors may be adjusted by further using azo compounds (commonly referred to as "dichroism dyes") exemplified in NON-PATENT DOCUMENT 1, etc.

A cleaning step (hereinafter, referred to as cleaning step 1) can be carried out after the dyeing step before the next step. Cleaning step 1 is a step involving cleaning the dye solvent adhering on the surface of the polyvinyl alcohol resin film during the dyeing step. It is possible to prevent dye from transferring into the liquid to be treated next by carrying out cleaning step 1. Water is generally used in cleaning step 1. According to the cleaning method, the polyvinyl alcohol resin film is preferably immersed in the solution; however, the polyvinyl alcohol resin film can be cleaned also by applying the solution to the polyvinyl alcohol resin film. The time for cleaning is not particularly limited, and 1 to 300 seconds is preferable, with 1 to 60 seconds more preferable. It is necessary for the temperature of the solvent in cleaning step 1 to be a temperature at which hydrophilic polymers do not dissolve therein. Generally, cleaning treatment is conducted on the film at 5 to 40° C. However, the present step may be omitted because excluding step 1 does not problematically affect performance.

After the dyeing step or cleaning step 1, a step involving allowing the film to comprise a cross-linker and/or a water resistant additive can be carried out. As cross-linkers, for example, boron compounds such as boric acid, borax or boric acid ammonium; polyhydric aldehydes such as glyoxal or glutaraldehyde; polyisocyanate compounds such as biuret types, isocyanurate types or block types; and titanium-based compounds such as titanium oxysulfate can be used. Ethylene glycol glycidyl ether, polyamide epichlorohydrin, etc. can be also used. As water resistant additives, succinic acid peroxide, ammonium persulfate, calcium perchlorate, benzoin ethyl ether, ethylene glycol diglycidyl ether, glycerin diglycidyl ether, ammonium chloride, or magnesium chloride, etc. are listed, and boric acid is preferably used. A step involving allowing the film to comprise a cross-linker and/or a water resistant additive is carried out using at least one or more of the above-mentioned cross-linkers and/or water resistant additives. Water is preferable as the solvent but not limited thereto. With respect to the concentration of the cross-linker and/or the water resistant additive in the solvent in the step involving allowing the film to comprise a cross-linker and/or a water resistant additive, taking boric acid for example, the concentration of the solvent is preferably 0.1 to 6.0 weight %, with 1.0 to 4.0 weight % more preferable. With respect to the solvent temperature in this step, 5 to 70° C. is preferable, with 5 to 50° C. more preferable. According to the method involving allowing the polyvinyl alcohol resin film to comprise a cross-linker and/or a water resistant additive, the film is preferably immersed in the solution; however, the solution may be applied to or coated to the polyvinyl alcohol resin film. Regarding the treatment time in this step, 30 seconds to 6 minutes is preferable, with 1 to 5 minutes more preferable. However, this treatment step may be omitted when time is to be shortened and/or when the cross-linkage treatment or water resistance treatment is not necessary, because it is not necessary to comprise a cross-linker and/or a water resistant additive.

After carrying out the dyeing step, cleaning step 1, or the step involving allowing the film to comprise a cross-linker and/or a water resistant additive, a drawing step is carried out. The drawing step is a step involving drawing a polyvinyl alcohol film into a single axis. The drawing method may be either one of a wet drawing method or a dry drawing method, with the present invention capable of being achieved if the draw ratio is drawn greater than or equal to three-fold. The draw ratio is drawn greater than or equal to three-fold, preferably five to seven-fold.

According to the dry drawing method, if the drawing heating medium is an air medium, the temperature of the air medium is preferably drawn at normal temperatures up to 180° C. Moreover, the humidity is preferably treated under an atmosphere of 20 to 95% RH. As the heating method, for example, a method of drawing a zone between rolls, a roll heating drawing method, a pressure drawing method, an infrared ray heating drawing method, etc. are listed, but not limited thereto. According to the drawing step, drawing can be carried out in a single step, and drawing may also be carried out in multiple steps.

In the case of the wet drawing method, the film is drawn in water, a water-soluble organic solvent, or a mixed solution thereof. The drawing treatment is preferably carried out while immersing the film in a solution comprising a cross-linker and/or a water resistant additive. As cross-linkers, for example, boron compounds such as boric acid, borax or boric acid ammonium; polyhydric aldehydes such as glyoxal or glutaraldehyde; polyisocyanate compounds such as biuret types, isocyanurate types or block types, or titanium-based compounds such as titanium oxysulfate can be used. Ethylene glycol glycidyl ether, polyamide epichlorohydrin, etc. can be also used. As water resistant additives, succinic acid peroxide, ammonium persulfate, calcium perchlorate, benzoin ethyl ether, ethylene glycol diglycidyl ether, glycerin diglycidyl ether, ammonium chloride or magnesium chloride, etc. are listed. Drawing is carried out in a solution comprising at least one or more of the above-mentioned cross-linkers and/or water resistant additives. As a cross-linker, boric acid is preferable. With respect to the concentration of the cross-linker and/or the water resistant additive in the drawing step, for example, 0.5 to 15 weight % is preferable, with 2.0 to 8.0 weight % more preferable. The draw ratio is preferably 2 to 8-fold, with 5 to 7-fold more preferable. The treatment is preferably carried out at a drawing temperature of 40 to 60° C., more preferably 45 to 58° C. Drawing time is normally 30 seconds to 20 minutes, more preferably 2 to 5 minutes. According to the wet drawing step, drawing can be carried out in a single step, and drawing may also be carried out in multiple steps.

After the drawing step is carried out, since precipitation of the cross-linker and/or water resistant additive or foreign substances may adhere on the surface of the film, a cleaning step (hereinafter, referred to as cleaning step 2) for cleaning the surface of the film can be carried out. The time for cleaning is preferably one to five minutes. According to the cleaning method, the film is preferably immersed in a cleaning solution; however, the solution may be applied to or coated to the polyvinyl alcohol resin film for cleaning the film. The cleaning treatment can be carried out in a single step, and the cleaning treatment can also be carried out in multiple steps. The solution temperature of the cleaning step is normally 5 to 50° C., preferably 10 to 40° C., but is not limited thereto.

As solvents used for the treatment steps above, for example, water; dimethyl sulfoxide; N-methylpyrrolidone; alcohols such as methanol, ethanol, propanol, isopropyl alcohol, glycerin, ethylene glycol, propylene glycol, diethylene glycol, triethylene glycol, tetraethylene glycol or trimethylolpropane, amines such as ethylenediamine or diethylene triamine can be listed but not limited thereto. Mixtures of more than one of these solvents can also be used. The most preferable solvent is water.

After the drawing step or cleaning step 2, a drying step of the film is carried out. The drying treatment can be carried out by allowing it to naturally dry; however, compression with rollers, an air knife, a water absorption roll, etc., and/or blast drying can also be carried out for removing moisture on the surface by better enhancing the drying efficiency. As the drying treatment temperature, the drying treatment is preferably carried out at 20 to 100° C., more preferably at 60 to 100° C. Regarding the time for the drying treatment, it can be applied for 30 seconds to 20 minutes, and 5 to 10 minutes is preferable.

According to the above-mentioned methods, it is possible to obtain polarizing elements that can express a high grade paper-like white using the absorption axes of the polarizing elements in parallel while having high transmittance, express achromatic properties in the parallel position even at a high degree of polarization and high transmittance, and have high durability, with a color phase having a neutral color as a single body. According to the combination of azo compounds of the present invention, polarizing elements are obtained which express a high-grade achromatic black when the absorption axes of the polarizing elements are positioned orthogonally.

The degree of polarization of polarizing elements thus obtained (hereinafter, also referred to as ρy) is preferably a value greater than or equal to the value obtained in formula (6) with a single body transmittance of 35% to 60%. A high degree of polarization can be maintained for high transmittance due to a degree of polarization greater than or equal to formula (6). Polarizing elements greater than or equal to the degree of polarization represented by formula (7) are more preferable.

$$\rho y = -0.0906 \times Y_s^2 + 5.97 \times Y_s \quad \text{formula (6)}$$

Wherein Ys is a single body transmittance and ρy is a degree of polarization.

$$\rho y = -0.0906 \times Y_s^2 + 5.97 \times Y_s + 1.0 \quad \text{formula (7)}$$

Wherein Ys is a single body transmittance and ρy is a degree of polarization.

The polarizing plate of the present invention is made by adhering the protection film on one or both surfaces of the polarizing element of the present invention obtained as described above. Here, the protection film is added in order to improve the water resistance, operatability, etc. of the polarizing elements, wherein appropriate transparent materials can be used to form the protection film. The protection film is a layered film capable of maintaining the shape of the polarizing element, wherein a plastic excellent in transparency, mechanical strength, thermal stability, moisture shielding properties, etc. is preferably used; however, the same function as plastic may be provided by forming a similar layer as plastic. Examples thereof include films obtained from thermoplastic resins such as polyester resins, acetate resins, polyethersulfone resins, polycarbonate resins, polyamide resins, polyimide resins, polyolefin resins or acrylic resins, and thermosetting resins or ultraviolet setting resins such as acrylic resins, urethane resins, acrylic urethane resins, epoxy resins, silicone resins. The polyolefin resins include amorphous polyolefin resin with polymerization units of cyclic polyolefins such as norbornene or polycyclic norbornene type monomers. Generally, a protection film that does not inhibit the functions of the polarizing elements is preferably selected after lamination of the protection film. As particularly preferably materials of the protection film, riacetylcellulose (TAC) made of a celluloseacetate resin and norbornene are list illustrated. They are preferable because they do not inhibit the functions of polarizing elements even if they laminate the protection film. In addition, a transparent protection film used for the protection film may be applied using a hard coat treatment, antireflection treatment, and treatment for the purpose of preventing and diffusing sticking, anti-glare, etc. as long as the film does not detract from the object of the present invention.

An adhesive is necessary in order to adhere the above-mentioned transparent protection layer to the polarizing elements. Polyvinyl alcohol adhesives are preferable as the adhesive but not limited thereto. For example, Gohsenol NH-26 (manufactured by NIPPON GOSEI), EXCEVAL RS-2117 (manufactured by KURAREY CO., LTD.), etc. are listed as polyvinyl alcohol adhesives, but not limited thereto. A cross-linker and/or water resistant additive can be added to an adhesive. A maleic acid anhydride-isobutylene copolymer is used as a polyvinyl alcohol adhesive Adhesives mixed with a cross-linker can be used if needed. As a maleic acid anhydride-isobutylene copolymer, for example, ISO-BAM #18 (manufactured by KURAREY CO., LTD.), ISO-BAM #04 (manufactured by KURAREY CO., LTD.), ammonia modified ISOBAM #104 (manufactured by KURAREY CO., LTD.), ammonia modified ISOBAM #110 (manufactured by KURAREY CO., LTD.), imid ISO-BAM#304 (manufactured by KURAREY CO., LTD.), imid ISOBAM #310 (manufactured by KURAREY CO., LTD.), etc. are listed. A hydrosoluble polyepoxy compound can be used as a cross-linker in this regard. As a hydrosoluble polyepoxy compound, for example, denacol EX-521 (manufactured by Nagase Chemtex Corporation), TETRAD-C (manufactured by Mitsui Chemicals, Inc.), etc. are listed. In addition, as an adhesive other than a polyvinyl alcohol resin, a publicly-known adhesive such as urethane, acrylic, and epoxy agents can also be used. Particularly, polyvinyl alcohol that is acetoacetyl group-modified is preferably used, and further, a polyhydric aldehyde is preferably used as a cross-linker thereof. In addition, for the purpose of improvement of the adhesive or improved water resistance, the adhesive can simultaneously comprise additives such as a zinc compound, chloride, iodide, etc. at a density of from approximately 0.1 to 10 weight %. The additives are also not limited. After adhering the transparent protection layers with the adhesive, a polarizing plate is obtained by drying or heat-treating them at an appropriate temperature.

Depending on the circumstances, for example, in the case of adhering the obtained polarizing plate onto a display made of liquid crystal, an organic electroluminescence (commonly referred to as OLED or OEL), etc., the polarizing plate may be provided with various functional layers for the purpose of view angle improvement and/or contrast improvement, layers or films with improved brightness on the surface of a protection layer or a film which will become an unexposed surface later. A gluing agent is preferably used for adhering the polarizing plate onto these films and displays. In addition, various functional layers may include a layer or film for controlling phase differences.

This polarizing plate may have various publicly-known functional layers such as an anti-reflection layer, an anti-glare layer, a hard coat layer, etc. on the other surface, namely, the surface to be exposed of the protection layer or film. In order to create this layer with various functionalities, a coating method is preferable; however, adhesives or gluing agents may be used for adhering a film with these functions.

According to the above-mentioned method, it is possible to obtain the polarizing plates with high durability which can express a high grade paper-like white while having a higher transmittance when the absorption axes of the polarizing elements are positioned in parallel, which is a high degree of polarization, and which express achromaticity while having a high transmittance, and further which can express neutral black when the absorption axes of the polarizing elements are positioned orthogonally. Specifically, the polarizing elements or polarizing plates comprising azo compounds can be obtained, wherein, in value a* and value b* obtained according to HS Z 8729, the absolute values of value a* and value b* when a single body transmittance is measured are equal to or less than 1, and the absolute values of value a* and value b* obtained using two of the polarizing elements or polarizing plates in which their absorption axes are positioned in parallel are equal to or less than 2, and the absolute values of value a* and value b* obtained using two of the polarizing elements or polarizing plates in which their absorption axes are positioned orthogonally equal to or less than 2, with a single body transmittance between 35% and 60%. The liquid crystal displays using the polarizing elements or polarizing plate of the present invention have high reliability, namely maintain high contrast for a long time and have high color reproducibility.

The thus obtained polarizing elements or polarizing plate of the present invention are used for liquid-crystal projectors, electronic calculators, clocks, notebook computers, word processors, liquid-crystal televisions, polarization lenses, polarization eye glasses, car navigation systems, interior and exterior measuring instruments and displays, etc., with a protection layer or a functional layer and a transparent supporting body, etc. such as glass, liquid crystal, and sapphire, as necessary. Particularly, the polarizing elements or polarizing plate of the present invention are utilized in reflective liquid crystal displays, semi-transmissive liquid crystal displays, organic electroluminescence, etc. as advantageous polarizing elements or polarizing plates.

EXAMPLES

Hereinafter, the present invention will be explained in greater detail according to the examples but not limited thereto. The transmittance shown in the examples will be evaluated as below.

The transmittance at each wavelength when one polarizing element or one polarizing plate is used was defined as transmittance Ts, the transmittance when two polarizing elements or two polarizing plates were overlapped such that the absorption axes thereof were positioned on the same direction was defined as parallel position transmittance Tp, and the transmittance when two polarizing plates were overlapped such that the absorption axes thereof were positioned orthogonally was defined as orthogonal position transmittance Tc.

Within the wavelength range of 400 to 700 nm, spectral transmittance τλ was obtained for each predetermined wavelength interval dλ (here, 5 nm) and Ys was calculated in formula (8) below by using the τλ. In the formula, Pλ represents the spectral distribution of standard light (C light source), and yλ represents the y (λ) color-matching function in a two degree view. Single body transmittance corrected according to visibility Ys was calculated using Ts for τλ, parallel position transmittance corrected according to visibility Yp was calculated using Tp for τλ, and orthogonal position transmittance corrected according to visibility Yc was calculated using Tc for τλ.

$$Ys = \frac{\int_{400}^{700} P\lambda \cdot y\lambda \cdot \tau\lambda \cdot d\lambda}{\int_{400}^{700} P\lambda \cdot y\lambda \cdot d\lambda} \quad \text{Formula (8)}$$

Spectral transmittance τλ was obtained using a spectral photometer ("U-4100" manufactured by Hitachi Ltd.).

Degree of polarization ρy was obtained from parallel transmittance Yp and orthogonal transmittance Yc in formula (9).

$$\rho y = \{(Yp - Yc)/(Yp + Yc)\}^{1/2} \times 100 \quad \text{formula (9)}$$

Example 1

A polyvinyl alcohol film (VF-PS, manufactured by KURAREY CO., LTD.), which has an average degree of polymerization of 2400 and a degree of saponification greater than or equal to 99%, was immersed in warm water at 45° C. for two minutes, the swelling treatment was applied thereto so that a draw ratio thereof became 1.30-fold. For a dyeing step, the swelling-treated film was immersed for four minutes 00 second in a liquid at 45° C. comprising 2000 parts by weight of water, 2.0 parts by weight of anhydrous sodium sulfate, 0.34 parts by weight of the azo compound described in Synthesis Example 1 of International Publication No. WO2012/165223 as an azo compound represented by formula (2), 0.027 parts by weight of the azo compound described in Synthesis Example 1 of JP 2003-215338 A as an azo compound represented by formula (3), 0.040 parts by weight of the azo compound described in Example 1 of JP 2622748 B as an azo compound represented by formula (4), and 0.16 parts by weight of C. I. Direct Orenge 39 as an azo compound represented by formula (5) to allow the film to comprise the azo compounds. The obtained film was immersed for one minute in an aqueous solution at 40° C. comprising a 20 g/l boric acid (manufactured by Societa Chimica Larderello s.p.a.). The obtained film was drawing-treated at 50° C. in an aqueous solution comprising 30.0 g/l boric acid for five minutes, while being drawn 5.0-fold. The obtained film was treated in water at 25° C. for 20 seconds while maintaining the state of tension thereof. The obtained film was drying-treated at 70° C. for nine minutes to obtain a polarizing element of the present invention. A triacetyl-cellulose film (ZRD-60, manufactured by FUJIFILM Holdings Corporation) that was alkali-treated using a polyvinyl alcohol adhesive was laminated on the obtained polarizing element to obtain a polarizing plate. The obtained polarizing plate maintains the function of the polarizing element of the present invention. The polarizing plate was defined as a measurement sample of Example 1.

Example 2 to Example 4, and Examples 7 to 9

In the dyeing step, polarizing elements were obtained in the same manner as Example 1 with the dying time variously changed, and then polarizing plates of the present invention were made.

Example 5

The polarizing element and polarizing plate of the present invention were obtained in the same manner as Example 1, except that the liquid comprising the azo compounds in the dyeing step was changed to a liquid comprising 2000 parts by weight of water, 2.0 parts by weight of anhydrous sodium sulfate, 0.34 parts by weight of the azo compound described in WO2012/165223, Composition Example 1 as an azo compound represented by formula (2), 0.027 parts by weight of the azo compound described in Composition Example 1 of JP 2003-215338 A as an azo compound represented by formula (3), 0.078 parts by weight of the azo compound described in JP 2622748 B, Example 3 as an azo compound represented by formula (4), and 0.145 parts by weight of the azo compound described in Example 1 of WO2007/138980 as an azo compound represented by formula (5).

Example 6

The polarizing element and polarizing plate of the present invention were obtained in the same manner as Example 1, except that the liquid comprising the azo compounds in the dyeing step was changed to a liquid comprising 2000 parts by weight of water, 2.0 parts by weight of anhydrous sodium sulfate, 0.34 parts by weight of the azo compound described in Composition Example 1 of WO2012/165223 as an azo compound represented by formula (2), 0.080 parts by weight of the azo compound described in Composition Example 1 of JP 4033443 B as an azo compound represented by formula (3), 0.040 parts by weight of the azo compound described in Example 1 of JP 2622748 B as an azo compound represented by formula (4), and 0.16 parts by weight of C. I. Direct Orenge 39 as an azo compound represented by formula (5).

Example 10

The polarizing element and polarizing plate of the present invention were obtained in the same manner as Example 1, except that the azo compound used as an azo compound represented by formula (3) was changed to C. I. Direct Red 81 (same parts by weight) known as an azo compound similarly expressing red.

Example 11

The polarizing element and polarizing plate of the present invention were obtained in the same manner as Example 1, except that the azo compound used as an azo compound represented by formula (3) was changed to C. I. Direct Red 117 (same parts by weight) known as an azo compound similarly expressing red.

Example 12

The polarizing element and polarizing plate of the present invention were obtained in the same manner as Example 1, except that the azo compound used as azo compound represented by formula (3) was changed to the azo compound (same parts by weight) described in JP 3661238 B (IIIa-6), which is an azo compound similarly expressing red.

Example 13

The polarizing element and polarizing plate of the present invention were obtained in the same manner as Example 1, except that the azo compound used as an azo compound represented by formula (4) was changed to the azo compound (same parts by weight) represented by formula (3) of JP 2002-105348 A, which is an azo compound, which has a similar structure to the previous azo compound.

Example 14

The polarizing element and polarizing plate of the present invention were obtained in the same manner as Example 1, except that the azo compound used as an azo compound represented by formula (4) was changed to the azo compound (same parts by weight) represented by formula (6) of WO2007-148757, which has a similar structure to the previous azo compound.

Example 15

The polarizing element and polarizing plate of the present invention were obtained in the same manner as Example 1, except that the azo compound used as an azo compound represented by formula (4) was changed to the azo compound (same parts by weight) represented by formula (34) of WO2009-142193, which has a similar structure to the previous azo compound.

Example 16

The polarizing element and polarizing plate of the present invention were obtained in the same manner as Example 1, except that the azo compound used as an azo compound represented by formula (2) was changed to 0.45 parts by weight of the azo compound described in Compound Example 27 of International Publication No. WO2012/165223.

Example 17

The polarizing element and polarizing plate of the present invention were obtained in the same manner as Example 1, except that the azo compound used as an azo compound represented by formula (5) was changed to 0.21 parts by weight of C. I. Direct Yellow 28, which is also a dichroism pigment with its highest absorption wavelength at 400 nm to 500 nm.

Example 18

The polarizing element and polarizing plate of the present invention were obtained in the same manner as Example 1, except that the azo compound used as an azo compound represented by formula (5) was changed to 0.30 parts by weight of C. I. Direct Orange 72, which also has its highest absorption wavelength at 400 nm to 500 nm.

Comparative Example 1

SHC-115, which is a neutral gray high transmittance dye polarizing plate manufactured by Polatechno Co., Ltd., was obtained and used as a measurement sample.

Comparative Example 2

SHC-128, which is a neutral gray dye polarizing plate with high contrast manufactured by Polatechno Co., Ltd., was obtained and used as a measurement sample.

Comparative Example 3 to Comparative Example 6

A polarizing plate was obtained in the same manner as Example 1, except that an iodic polarizing plate was created without azo compounds by arbitrarily changing time for immersing the film into a liquid comprising iodine in accordance with the prescription described in Comparative Example 1 of JP 2008-065222 A, and then used as a measurement sample.

Comparative Example 7

SKN-18242P, which is a neutral gray iodic polarizing plate with super high contrast manufactured by Polatechno Co., Ltd., was obtained and used as a measurement sample.

Comparative Example 8

SKN-18241P, which is a neutral gray iodic polarizing plate with super high contrast manufactured by Polatechno Co., Ltd., was obtained and used as a measurement sample.

Comparative Example 9

SKW-18245P, which is an iodic polarizing plate expressing Paper White in the parallel position manufactured by Polatechno Co., Ltd., was obtained and used as a measurement sample.

Comparative Example 10

Polarizing element and polarizing plate were obtained based on Example 1 of JP H11-218611 A, which describes a dye polarizing plate, and then used as measurement samples.

Comparative Example 11

Polarizing element and polarizing plate were obtained based on Example 3 of JP 4162334 B, which describes a dye polarizing plate, and then used as measurement samples.

Comparative Example 12

Polarizing element and polarizing plate were obtained based on Example 1 of JP 4360100 B, which describes a dye polarizing plate, and then used as measurement samples.

Comparative Example 13

Polarizing element and polarizing plate were obtained in the same manner as Example 1, except that the azo compound used as an azo compound represented by formula (3) was changed to 0.087 parts by weight of C. I. Direct Red 80, which is an azo compound having a ureido skeleton with the same color, and that the polarizing element and polarizing plate were designed such that they expressed neutral gray as a single body, transmittance in the orthogonal position was more or less fixed, and the color thereof was black; and then used as a measurement sample.

Comparative Example 14

Polarizing element and polarizing plate were obtained in the same manner as Example 1, except that the azo compound used as an azo compound represented by formula (3) was changed to 0.077 parts by weight of C. I. Direct Red 84, which is an azo compound having a ureido skeleton with the same color, and that the polarizing element and polarizing plate were designed such that they expressed neutral gray as a single body, transmittance in the orthogonal position was more or less fixed, and the color thereof was black, and then used as a measurement sample.

Comparative Example 15

Polarizing element and polarizing plate were obtained in the same manner as Example 1, except that the azo compound used as an azo compound represented by formula (3) was changed to 0.055 parts by weight of C. I. Direct Red 7, which is an azo compound having a dianisidine skeleton with the same color, and that the polarizing element and polarizing plate were designed such that they expressed neutral gray as a single body, transmittance in the orthogonal position was more or less fixed, and the color thereof was black, and then used as a measurement sample.

Comparative Example 16

Polarizing element and polarizing plate were obtained in the same manner as Example 1, except that the azo compound used as an azo compound represented by formula (3) was changed to 0.047 parts by weight of C. I. Direct Red 45, which is an azo compound having the same color dichroism, and that the polarizing element and polarizing plate were designed such that they expressed neutral gray as a single body, transmittance in the orthogonal position was more or less fixed, and the color thereof was black, and then used as a measurement sample.

Comparative Example 17

Polarizing element and polarizing plate were obtained in the same manner as Example 1, except that the azo compound used as an azo compound represented by formula (4) was changed to 0.07 parts by weight of C. I. Direct Blue 6, which is an azo compound having a dianisidine skeleton with the same color, and that the polarizing element and polarizing plate were designed such that they expressed neutral gray as a single body, transmittance in the orthogonal position was more or less fixed, and the color thereof was black, and then used as a measurement sample.

Comparative Example 18

Polarizing element and polarizing plate were obtained in the same manner as Example 1, except that the azo compound used as an azo compound represented by formula (4) was changed to 0.061 parts by weight of C. I. Direct Blue 15, which is an azo dye with the same color, and that the polarizing element and polarizing plate were designed such that they expressed neutral gray as a single body, transmittance in the orthogonal position was more or less fixed, and the color thereof was black, and then used as a measurement sample.

Comparative Example 19

Polarizing element and polarizing plate were obtained in the same manner as Example 1, except that the azo compound used as an azo compound represented by formula (4) was changed to 0.052 parts by weight of C. I. Direct Blue 71, which a tris azo dye with the same color, and that the polarizing element and polarizing plate were designed such that they expressed neutral gray as a single body, transmittance in the orthogonal position was more or less fixed, and the color thereof was black, and then used as a measurement sample.

Comparative Example 20

Polarizing element and polarizing plate were obtained in the same manner as Example 1, except that the azo compound used as an azo compound represented by formula (2) was changed to 0.40 parts by weight of C. I. Direct Blue 199, which is a direct dye with the same color, and that the polarizing element and polarizing plate were designed such that they expressed neutral gray as a single body, transmittance in the orthogonal position was more or less fixed, and the color thereof was black, and then used as a measurement sample.

Comparative Example 21

Polarizing element and polarizing plate were obtained in the same manner as Example 1, except that the azo compound used as an azo compound represented by formula (2) was changed to 0.415 parts by weight of C. I. Direct Blue 218, which a direct dye with the same color and a similar copperization dye, and that the polarizing element and polarizing plate were designed such that they expressed neutral gray as a single body, transmittance in the orthogonal position was more or less fixed, and the color thereof was black, and then used as a measurement sample.

Table 1 shows, regarding the polarizing elements or polarizing plates obtained in Examples 1 to 18 and Comparative Examples 1 to 21, Ys, Yp, and Yc thereof, the average value of transmittance (Tp) at 420 nm to 480 nm (Ave 420 to 480), the average value of transmittance (Tp) at 520 nm to 590 nm (Ave 520 to 590), and the average value of transmittance (Tp) at 600 nm to 640 nm (Ave 600 to 640) when the absorption axes of two of each polarizing element or polarizing plate were positioned in parallel, and the average value of transmittance (Tc) at 420 nm to 480 nm (Ave 420 to 480), the average value of transmittance (Tc) at 520 nm to 590 nm (Ave 520 to 590), and the average value of 600 nm to 640 nm (Ave 600 to 640) when the absorption axes of two of each polarizing element or polarizing plate were positioned orthogonally.

TABLE 1

| | | | | Tp | | | Tc | | |
|---|---|---|---|---|---|---|---|---|---|
| | Ys | Yp | Yc | Ave 420-480 | Ave 520-590 | Ave 600-640 | Ave 420-480 | Ave 520-590 | Ave 600-640 |
| Example 1 | 47.52 | 37.71 | 7.480 | 37.540 | 37.536 | 37.901 | 7.213 | 7.217 | 7.375 |
| Example 2 | 45.18 | 36.38 | 4.467 | 36.293 | 36.178 | 36.599 | 4.253 | 4.275 | 4.336 |
| Example 3 | 39.24 | 30.57 | 0.223 | 30.784 | 30.626 | 31.643 | 0.218 | 0.263 | 0.208 |

TABLE 1-continued

|  | Ys | Yp | Yc | Tp Ave 420-480 | Tp Ave 520-590 | Tp Ave 600-640 | Tc Ave 420-480 | Tc Ave 520-590 | Tc Ave 600-640 |
|---|---|---|---|---|---|---|---|---|---|
| Example 4 | 50.19 | 39.49 | 10.890 | 38.886 | 39.376 | 40.424 | 10.918 | 10.865 | 11.134 |
| Example 5 | 44.87 | 35.97 | 4.288 | 35.992 | 35.920 | 36.807 | 4.334 | 4.411 | 4.387 |
| Example 6 | 46.83 | 37.02 | 6.844 | 37.033 | 36.840 | 37.706 | 6.863 | 6.978 | 7.040 |
| Example 7 | 58.20 | 46.31 | 21.439 | 46.299 | 46.105 | 47.050 | 21.539 | 21.389 | 21.399 |
| Example 8 | 38.52 | 29.58 | 0.093 | 29.515 | 28.313 | 30.080 | 0.080 | 0.082 | 0.080 |
| Example 9 | 37.10 | 27.52 | 0.012 | 27.619 | 27.315 | 28.090 | 0.001 | 0.001 | 0.001 |
| Example 10 | 43.98 | 34.95 | 3.744 | 34.097 | 34.814 | 35.510 | 3.721 | 3.711 | 3.699 |
| Example 11 | 43.65 | 34.78 | 3.344 | 33.817 | 34.517 | 35.210 | 3.307 | 3.299 | 3.256 |
| Example 12 | 43.87 | 34.74 | 3.754 | 33.201 | 34.482 | 35.270 | 3.710 | 3.770 | 3.738 |
| Example 13 | 44.23 | 35.54 | 3.590 | 33.792 | 35.290 | 36.110 | 3.603 | 3.601 | 3.621 |
| Example 14 | 43.91 | 35.08 | 3.489 | 35.072 | 34.854 | 35.550 | 3.499 | 3.458 | 3.435 |
| Example 15 | 43.20 | 34.10 | 3.218 | 33.010 | 33.910 | 34.690 | 3.187 | 3.199 | 3.159 |
| Example 16 | 44.87 | 35.69 | 4.586 | 34.870 | 35.421 | 36.201 | 4.484 | 4.458 | 4.445 |
| Example 17 | 45.01 | 35.39 | 5.130 | 33.752 | 35.185 | 35.874 | 5.109 | 5.090 | 5.050 |
| Example 18 | 44.91 | 35.25 | 5.085 | 33.154 | 35.012 | 35.802 | 5.126 | 5.102 | 5.085 |
| Comparative Example 1 | 43.15 | 35.79 | 1.450 | 33.009 | 30.005 | 36.250 | 1.831 | 1.533 | 0.834 |
| Comparative Example 2 | 39.10 | 30.58 | 0.022 | 26.061 | 30.891 | 31.670 | 0.027 | 0.022 | 0.011 |
| Comparative Example 3 | 40.66 | 33.08 | 0.003 | 27.371 | 33.272 | 34.687 | 0.001 | 0.001 | 0.002 |
| Comparative Example 4 | 41.54 | 34.52 | 0.005 | 29.388 | 34.633 | 35.978 | 0.006 | 0.003 | 0.003 |
| Comparative Example 5 | 42.09 | 35.44 | 0.004 | 29.533 | 36.617 | 37.067 | 0.007 | 0.003 | 0.003 |
| Comparative Example 6 | 42.94 | 36.88 | 0.008 | 31.768 | 37.144 | 38.283 | 0.011 | 0.003 | 0.010 |
| Comparative Example 7 | 42.40 | 35.98 | 0.004 | 31.618 | 36.693 | 37.315 | 0.019 | 0.004 | 0.001 |
| Comparative Example 8 | 40.95 | 33.54 | 0.001 | 28.730 | 33.682 | 34.969 | 0.003 | 0.001 | 0.000 |
| Comparative Example 9 | 44.87 | 39.43 | 0.848 | 36.329 | 39.479 | 39.650 | 6.129 | 0.821 | 0.022 |
| Comparative Example 10 | 40.28 | 31.02 | 1.432 | 26.160 | 30.802 | 31.254 | 1.699 | 1.209 | 1.182 |
| Comparative Example 11 | 41.32 | 33.15 | 0.989 | 23.981 | 32.915 | 33.852 | 0.864 | 0.753 | 0.715 |
| Comparative Example 12 | 41.31 | 33.40 | 0.726 | 29.084 | 33.181 | 35.252 | 0.606 | 0.589 | 0.515 |
| Comparative Example 13 | 44.36 | 30.48 | 8.879 | 26.405 | 30.166 | 32.985 | 8.972 | 8.565 | 8.123 |
| Comparative Example 14 | 44.35 | 31.39 | 7.952 | 26.842 | 31.407 | 34.252 | 7.985 | 7.681 | 7.252 |
| Comparative Example 15 | 43.55 | 28.95 | 8.975 | 24.216 | 28.953 | 32.059 | 8.925 | 8.761 | 8.710 |
| Comparative Example 16 | 43.25 | 31.05 | 6.357 | 25.981 | 30.815 | 33.895 | 6.875 | 6.153 | 6.105 |
| Comparative Example 17 | 43.25 | 31.90 | 5.513 | 27.546 | 31.651 | 32.895 | 5.556 | 5.299 | 5.215 |
| Comparative Example 18 | 44.56 | 30.46 | 9.256 | 26.584 | 30.185 | 31.985 | 9.251 | 9.152 | 9.183 |
| Comparative Example 19 | 45.21 | 32.18 | 8.697 | 25.613 | 31.804 | 32.859 | 8.684 | 8.053 | 7.654 |
| Comparative Example 20 | 44.90 | 24.63 | 15.687 | 22.562 | 24.235 | 25.615 | 14.103 | 14.985 | 13.525 |
| Comparative Example 21 | 44.18 | 30.23 | 8.811 | 26.352 | 30.352 | 31.562 | 8.662 | 8.458 | 8.354 |

Table 2 shows, regarding the polarizing elements or polarizing plates obtained in Examples 1 to 18 and Comparative Examples 1 to 21, the absolute value of the difference between the average value of transmittance (Tp) at 520 nm to 590 nm (Ave 520 to 590) and the average value of transmittance (Tp) at 420 nm to 480 nm (Ave 420 to 480), as well as the absolute value of the difference between the average value of transmittance (Tp) at 520 nm to 590 nm (Ave 520 to 590) and the average value of transmittance (Tp) at 600 nm to 640 nm (Ave 600 to 640) when the absorption axes of two of each polarizing element or polarizing plate were positioned in parallel, and the absolute value of the difference between the average value of transmittance (Tc) at 520 nm to 590 nm (Ave 520 to 590) and the average value of transmittance (Tc) at 420 nm to 480 nm (Ave 420 to 480), as well as the absolute value of the difference between the average value at 520 nm to 590 nm (Ave 520 to 590) and the average value of transmittance (Tc) at 600 nm to 640 nm (Ave 600 to 640) when the absorption axes of two of each polarizing element or polarizing plate were positioned orthogonally.

TABLE 2

| | The absolute value of the difference from the average value in Tp at 520-590 nm in which two polarizing elements or polarizing plates are positioned in parallel | | The absolute value of the difference from the average value in Tc at 520-590 nm in which two polarizing elements or polarizing plates are positioned orthogonally | |
|---|---|---|---|---|
| | Ave 420-480 | Ave 600-640 | Ave 420-480 | Ave 600-640 |
| Example 1 | 0.00 | 0.36 | 0.0046 | 0.1575 |
| Example 2 | 0.12 | 0.42 | 0.0221 | 0.0607 |
| Example 3 | 0.16 | 1.22 | 0.0452 | 0.0550 |
| Example 4 | 0.39 | 1.05 | 0.0528 | 0.2687 |
| Example 5 | 0.07 | 0.89 | 0.0773 | 0.0244 |
| Example 6 | 0.19 | 0.87 | 0.1145 | 0.0620 |
| Example 7 | 0.19 | 0.94 | 0.1500 | 0.0095 |
| Example 8 | 0.20 | 0.77 | 0.0017 | 0.0017 |
| Example 9 | 0.30 | 0.77 | 0.0000 | 0.0001 |
| Example 10 | 0.82 | 0.70 | 0.0107 | 0.0120 |
| Example 11 | 0.70 | 0.69 | 0.0081 | 0.0424 |
| Example 12 | 1.28 | 0.79 | 0.0593 | 0.0314 |
| Example 13 | 1.50 | 0.82 | 0.0013 | 0.0200 |
| Example 14 | 0.22 | 0.70 | 0.0405 | 0.0231 |
| Example 15 | 0.90 | 0.78 | 0.0120 | 0.0396 |
| Example 16 | 0.55 | 0.78 | 0.0056 | 0.0131 |
| Example 17 | 1.43 | 0.69 | 0.0194 | 0.0400 |
| Example 18 | 1.86 | 0.79 | 0.0238 | 0.0169 |
| Comparative Example 1 | 3.00 | 0.25 | 0.2982 | 0.6989 |
| Comparative Example 2 | 4.83 | 0.78 | 0.0046 | 0.0113 |
| Comparative Example 3 | 5.90 | 1.41 | 0.0001 | 0.0015 |
| Comparative Example 4 | 5.23 | 1.35 | 0.0047 | 0.0002 |
| Comparative Example 5 | 6.08 | 1.45 | 0.0043 | 0.0000 |
| Comparative Example 6 | 5.38 | 1.14 | 0.0075 | 0.0071 |
| Comparative Example 7 | 5.07 | 0.62 | 0.0148 | 0.0028 |
| Comparative Example 8 | 4.95 | 1.29 | 0.0023 | 0.0003 |
| Comparative Example 9 | 3.15 | 0.17 | 5.3086 | 0.7988 |
| Comparative Example 10 | 4.64 | 0.45 | 0.4903 | 0.0287 |
| Comparative Example 11 | 3.93 | 0.94 | 0.1111 | 0.0378 |
| Comparative Example 12 | 4.10 | 2.07 | 0.0169 | 0.0738 |
| Comparative Example 13 | 3.76 | 2.82 | 0.4073 | 0.4418 |
| Comparative Example 14 | 4.56 | 2.85 | 0.3040 | 0.4297 |
| Comparative Example 15 | 4.74 | 3.11 | 0.1636 | 0.0511 |
| Comparative Example 16 | 4.83 | 3.08 | 0.7225 | 0.0475 |
| Comparative Example 17 | 4.11 | 1.24 | 0.2575 | 0.0837 |
| Comparative Example 18 | 3.60 | 1.80 | 0.0989 | 0.0306 |
| Comparative Example 19 | 6.19 | 1.06 | 0.6316 | 0.3984 |
| Comparative Example 20 | 1.67 | 1.38 | 0.8825 | 1.4599 |
| Comparative Example 21 | 4.00 | 1.21 | 0.1940 | 0.1040 |

From Table 2, it is found that, according to the polarizing elements comprising azo compounds obtained from Examples 1 to 18, in each wavelength transmittance obtained using two of the polarizing elements or polarizing plates in which their absorption axes are positioned in parallel, the average transmittance at 520 nm to 590 nm is greater than or equal to 25%, the absolute value of the difference between the average transmittance at 420 nm to 480 nm and the average transmittance at 520 nm to 590 nm is equal to or less than 2.5%, and the absolute value of the difference between the average transmittance at 520 nm to 590 nm and the average transmittance at 590 nm to 640 nm is equal to or less than 2.0%. Further, in each wavelength transmittance obtained using two of the polarizing element or polarizing plate in which their absorption axes are positioned orthogonally, the absolute value of the difference between the average transmittance at 420 nm to 480 nm and the average transmittance at 520 nm to 590 nm is equal to or less than 0.3%, and the absolute value of the difference between the average transmittance at 520 nm to 590 nm and the average transmittance at 600 nm to 640 nm is equal to or less than 0.3%.

Table 3 shows, regarding the polarizing elements or polarizing plates obtained in Examples 1 to 18 and Comparative Examples 1 to 21, Ys and ρy of each polarizing plate, value a* (a*-s) and value b* (b*-s) of a single body of each polarizing plate described according to light source in a two degree view in JIS Z8729 C, value a* (a*-p) and value b* (b*-p) obtained using two of each polarizing element or polarizing plate in which their absorption axes were positioned in parallel, and value a* (a*-c), value b* (b*-c) obtained using two of each polarizing element or polarizing plate in which their absorption axes were positioned orthogonally, all of which were obtained in Examples 1 to 18 and Comparative Examples 1 to 21. In addition, we heard opinions on the colors of the polarizing plates when it indicated white in the parallel position and the colors thereof when it indicated black in the orthogonal position from 10 observers, then we represent the most common opinions regarding the visually obtained colors.

TABLE 3

| | Ys | py | a*-s | b*-s | a*-p | b*-p | a*-o | b*-o | Visual color of polarizing plate Parallel position | Orthogonal position |
|---|---|---|---|---|---|---|---|---|---|---|
| Example 1 | 47.52 | 81.87 | −0.34 | 0.26 | −0.29 | 0.19 | −0.80 | 0.99 | White | Black |
| Example 2 | 45.18 | 86.46 | −0.33 | 0.16 | −0.31 | 0.07 | −0.89 | 0.97 | White | Black |
| Example 3 | 39.24 | 99.27 | −0.31 | 0.12 | −0.41 | 0.11 | −0.66 | 0.49 | White | Black |
| Example 4 | 50.19 | 76.34 | −0.22 | 0.06 | −0.18 | 0.09 | −0.51 | 0.20 | White | Black |
| Example 5 | 44.87 | 88.71 | −0.19 | 0.06 | 0.01 | 1.02 | −0.21 | 0.92 | White | Black |
| Example 6 | 46.83 | 82.95 | −0.17 | −0.26 | 0.72 | −0.21 | −0.32 | 0.65 | White | Black |
| Example 7 | 58.20 | 60.59 | −0.28 | 0.41 | −0.08 | 0.62 | −0.71 | 0.72 | White | Black |
| Example 8 | 38.52 | 99.69 | −0.35 | 0.34 | −0.25 | 0.53 | −0.41 | 0.56 | White | Black |
| Example 9 | 37.10 | 99.95 | −0.17 | −0.08 | 0.21 | −0.62 | −0.63 | 0.22 | White | Black |
| Example 10 | 43.98 | 89.80 | 0.14 | 0.82 | 0.56 | 1.87 | −0.12 | −1.65 | White | Black |
| Example 11 | 43.65 | 90.80 | −0.18 | 0.66 | −0.24 | 1.90 | −0.56 | −1.35 | White | Black |
| Example 12 | 43.87 | 89.72 | 0.20 | 0.56 | 0.44 | 1.62 | −0.81 | 1.79 | White | Black |
| Example 13 | 44.23 | 90.36 | −0.16 | 0.61 | −0.31 | 1.69 | −0.35 | 1.21 | White | Black |
| Example 14 | 43.91 | 90.50 | −0.82 | 0.37 | −1.73 | 1.25 | 0.33 | 0.21 | White | Black |
| Example 15 | 43.20 | 90.97 | −0.23 | 0.47 | −1.06 | 1.48 | 0.22 | −0.98 | White | Black |
| Example 16 | 44.87 | 87.88 | −0.28 | 0.46 | −1.52 | 1.46 | 0.92 | 0.92 | White | Black |
| Example 17 | 45.01 | 86.42 | 0.19 | 1.13 | 0.64 | 1.48 | 0.14 | −1.45 | White | Black |
| Example 18 | 44.91 | 86.48 | 0.34 | 0.82 | 0.99 | 1.87 | 0.01 | −1.88 | White | Black |
| Comparative Example 1 | 43.13 | 96.03 | −0.47 | 1.63 | −0.47 | 3.53 | −2.59 | −3.84 | Yellow | Blue-green |
| Comparative Example 2 | 39.09 | 99.93 | −0.42 | 3.69 | −0.56 | 6.69 | −0.03 | −0.08 | Yellow | Black |
| Comparative Example 3 | 40.66 | 99.99 | −1.73 | 4.26 | −2.91 | 7.71 | 0.01 | −0.01 | Yellow-green | Black |
| Comparative Example 4 | 41.54 | 99.99 | −1.43 | 4.18 | −2.53 | 7.62 | 0.02 | −0.07 | Yellow-green | Black |
| Comparative Example 5 | 42.09 | 99.99 | −1.37 | 4.15 | −2.36 | 7.62 | 0.02 | −0.07 | Yellow-green | Black |
| Comparative Example 6 | 42.94 | 99.99 | −1.13 | 3.44 | −1.99 | 6.38 | 0.05 | −0.10 | Yellow-green | Black |
| Comparative Example 7 | 42.40 | 99.99 | −1.37 | 3.33 | −2.36 | 6.17 | 0.04 | −0.20 | Yellow-green | Black |
| Comparative Example 8 | 40.95 | 100.00 | −0.97 | 3.56 | −1.57 | 6.52 | 0.01 | −0.04 | Yellow-green | Black |
| Comparative Example 9 | 44.86 | 97.87 | 0.32 | −2.79 | −1.00 | 0.95 | 19.58 | −38.73 | White | Blue-purple |
| Comparative Example 10 | 40.28 | 95.49 | −0.45 | 2.13 | −0.48 | 6.88 | −0.69 | 0.63 | Yellow | Black |
| Comparative Example 11 | 41.32 | 97.08 | −0.49 | 4.65 | −0.21 | 7.28 | −0.55 | 0.15 | Yellow | Black |
| Comparative Example 12 | 41.31 | 97.85 | −0.81 | 8.36 | −1.20 | 11.26 | −0.36 | 0.95 | Yellow | Black |
| Comparative Example 13 | 44.36 | 74.08 | 4.00 | 7.07 | 7.98 | 8.92 | 0.10 | 0.32 | Orange | Black |
| Comparative Example 14 | 44.35 | 77.18 | 3.77 | 6.32 | 6.25 | 8.37 | 0.36 | −0.34 | Orange | Black |
| Comparative Example 15 | 43.55 | 72.57 | 2.99 | 5.87 | 5.63 | 7.36 | −0.51 | −0.58 | Orange | Black |
| Comparative Example 16 | 43.25 | 83.98 | 3.27 | 5.31 | 6.70 | 6.92 | −0.63 | −0.94 | Orange | Black |
| Comparative Example 17 | 44.25 | 83.98 | −1.38 | 6.20 | −3.06 | 7.08 | −0.31 | 0.67 | Yellow-green | Black |
| Comparative Example 18 | 44.56 | 73.06 | −0.97 | 6.91 | −2.30 | 8.19 | 0.37 | −0.68 | Yellow-green | Black |
| Comparative Example 19 | 45.21 | 75.80 | −2.22 | 7.57 | −4.68 | 9.26 | 0.69 | −0.49 | Yellow-green | Black |
| Comparative Example 20 | 44.90 | 47.10 | −7.82 | 2.57 | −15.69 | 3.55 | −1.89 | −0.21 | Yellow-green | Black |
| Comparative Example 21 | 44.18 | 74.07 | −1.91 | 2.76 | −4.10 | 5.96 | −0.52 | −0.37 | Yellow-green | Black |

From the results of Table 3, according to the polarizing elements of the present invention comprising the azo compounds represented by formula (1) and formula (2) or salts thereof, wherein the absolute value of the difference between the average transmittance at 420 nm to 480 nm and the average transmittance at 520 nm to 590 nm is equal to or less than 2.5, and the absolute value of the difference between the average transmittance at 520 nm to 590 nm and the average transmittance at 590 nm to 640 nm is equal to or less than 2.0, it is found that the present polarizing elements can express a high grade paper-like white using the absorption axes of the polarizing elements in parallel while having high transmittance, and express achromatic properties in the parallel position even at a high degree of polarization and high transmittance, with a color phase having a neutral color as a single body. Further, it is found that polarizing elements can be obtained which express a high-grade achromatic black when the absorption axes of the polarizing elements are positioned orthogonally.

Durability Test

When the polarizing plates according to Examples 1 to 18 and Comparative Examples 3 to 9 were applied in the environment at 85° C. with a relative humidity of 85% RH for 240 hours, the degrees of polarization of the polarizing plates in Comparative Examples 3 to 9 were lowered greater than or equal to 10%, b*-c is lower than -10, the visual colors thereof were changed to blue, and particularly when the polarizing plates were positioned orthogonally, they strongly express blue. In contrast, the polarizing plates according to Examples 1 to 18 of the present application underwent no change in transmittance and color phase. This revealed that liquid crystal displays using the polarizing elements or polarizing plates of the present invention have high reliability, high contrast over the long term, and high color reproducibility.

The invention claimed is:

1. A polarizing element, comprising an azo compound represented by formula (1) or a salt thereof and an azo compound represented by formula (2) or a salt thereof, wherein the absolute value of the difference between the average transmittance at 420 nm to 480 nm and the average transmittance at 520 nm to 590 nm is equal to or less than 2.5%, and the absolute value of the difference between the average transmittance at 520 nm to 590 nm and the average transmittance at 590 nm to 640 nm is equal to or less than 2.0% , wherein each wavelength transmittance is obtained using two of said polarizing elements in which their absorption axes are positioned in parallel:

least one of the substituents is a sulfo group, a lower alkyl group, a lower alkoxy group, a lower alkoxy group having a sulfo group, a carboxy group, a nitro group, an amino group, or a substituted amino group, and $R_5$ and $R_6$ each independently represent any of a hydrogen atom, a lower alkyl group, a lower alkoxy group, or a lower alkoxy group having a sulfo group.

2. The polarizing element according to claim 1, wherein, in value a* and value b* obtained according to JIS Z 8729, the absolute values of value a* and value b* when single body transmittances are measured are equal to or less than 1, and the absolute values of value a* and value b* obtained using two of said polarizing elements in which their absorption axes are positioned in parallel are equal to or less than 2.

3. The polarizing element according to claim 1, wherein a single body transmittance of said polarizing element is between 35% and 60%, and in each wavelength transmittance obtained using two of said polarizing elements in which their absorption axes are positioned in parallel, the average transmittance at 520 nm to 590 nm is between 25% and 55%.

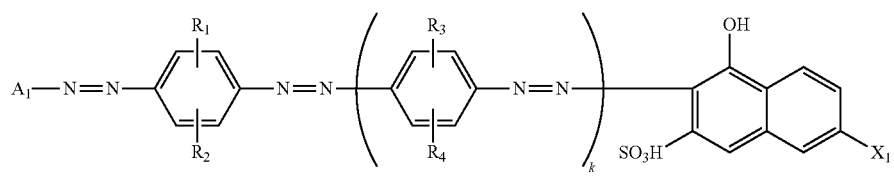

Formula (1)

wherein $A_1$ represents a phenyl group or a naphthyl group having a substituent, $R_1$ to $R_4$ each independently represent any of a hydrogen atom, a lower alkyl group, a lower alkoxy group, or a lower alkoxy group having a sulfo group, $X_1$ represents an amino group that may have a substituent, and k represents an integer of 0 or 1; and 4. The polarizing element according to claim 1, wherein the polarizing element comprises at least one azo compound represented by the following formula (3) or a salt thereof and at least one azo compound represented by the following formula (4) or a salt thereof as azo compounds represented by formula (1) or salts thereof:

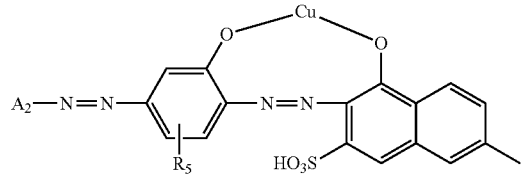

Formula (2)

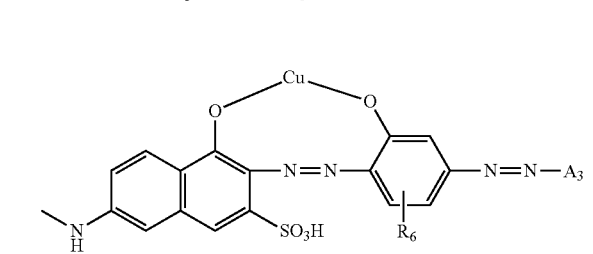

Formula (3)

wherein $A_2$ and $A_3$ each independently represent a naphthyl group or a phenyl group having one or more substituents, at wherein $A_4$ represents a phenyl group or a naphthyl group having a substituent, $R_7$ and $R_8$ each independently represent any of a hydrogen atom, a lower alkyl group, a lower alkoxy group, or a lower alkoxy group having a sulfo group, and $X_2$ represents a phenyl amino group that may have a substituent, or a benzoyl amino group that may have a substituent; and

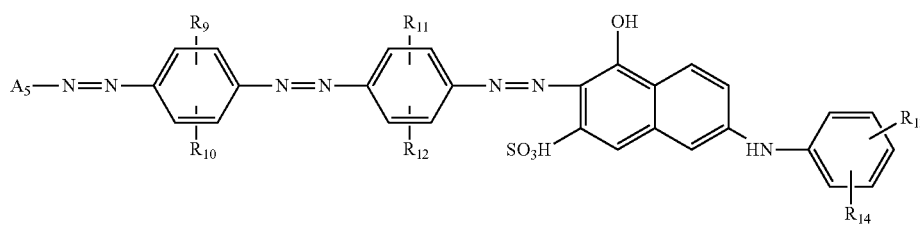

Formula (4)

wherein $A_5$ represents a phenyl group or a naphthyl group having a substituent, $R_9$ to $R_{12}$ each independently represent any of a hydrogen atom, a lower alkyl group, a lower alkoxy group, or a lower alkoxy group having a sulfo group, $R_{13}$ and $R_{14}$ each independently represent any of a hydrogen atom, a methyl group, a methoxy group, a sulfo group, an amino group or a substituted amino group, except that all of $R_9$ to $R_{12}$ are simultaneously lower alkoxy groups.

5. The polarizing element according to claim 4, wherein $X_2$ in formula (3) is a phenyl amino group that may have a substituent, and the substituent of the phenyl group is any of a hydrogen atom, a methyl group, a methoxy group, a sulfo group, or an amino group.

6. The polarizing element according to claim 4, wherein at least one of $R_{13}$ and $R_{14}$ in formula (4) is any of a hydrogen atom, a methyl group, a methoxy group, a sulfo group, or an amino group.

7. The polarizing element according to claim 4, wherein $A_4$ in formula (3) is a phenyl group having any substituent from among a methyl group, a methoxy group, a sulfo group, an amino group, or a benzoyl group.

8. The polarizing element according to claim 4, wherein As in formula (4) is a phenyl group having any substituent from among a methyl group, a methoxy group, a sulfo group, an amino group, or a benzoyl group.

9. The polarizing element according to claim 4, wherein at least one of $R_{11}$ and $R_{12}$ in formula (4) is a methoxy group.

10. The polarizing element according to claim 4, wherein at least one of $R_9$ and $R_{10}$ in formula (4) is a methoxy group.

11. The polarizing element according to claim 1, wherein the polarizing element further comprises an azo compound represented by the following formula (5) or a salt thereof in addition to the azo compound represented by formula (1) or a salt thereof and the azo compound represented by formula (2) or a salt thereof:

wherein $R_{15}$ and $R_{16}$ each independently represent any of a sulfo group, a carboxy group, a hydroxy group, a lower alkyl group, or a lower alkoxyl group, and n represents an integer from 1 to 3.

12. The polarizing element according to claim 11, wherein the polarizing element comprises an azo compound represented by formula (3) or a salt thereof and an azo compound represented by formula (4) or a salt thereof as azo compounds represented by formula (1) or salts thereof.

13. The polarizing element according to claim 1, wherein, in each wavelength transmittance obtained using two of said polarizing elements in which their absorption axes are positioned orthogonally, the absolute value of the difference between the average transmittance at 420 nm to 480 nm and the average transmittance at 520 nm to 590 nm is equal to or less than 0.3%, and the absolute value of the difference between the average transmittance at 520 nm to 590 nm and the average transmittance at 600 nm to 640 nm is equal to or less than 0.3%.

14. The polarizing element according to claim 1, wherein the absolute values of value a* and value b* obtained using two of said polarizing elements in which their absorption axes are positioned orthogonally are equal to or less than 2.

15. The polarizing element according to claim 1, wherein $A_2$ and $A_3$ in formula (2) are each independently a naphthyl group having two or more sulfo groups.

16. The polarizing element according to claim 1, wherein at least one of $R_5$ and $R_6$ in formula (2) is a methyl group.

17. The polarizing element according to claim 1, wherein the substrate is comprised of a polyvinyl alcohol resin film.

18. The polarizing element according to claim 1, wherein the polarizing element has a single body transmittance between 35% and 60% and has a degree of polarization greater than or equal to the value obtained by formula (6):

$$\rho y = -0.0906 \times Y_s^2 + 5.97 \times Y_s \quad \text{formula (6)}$$

Formula (5)

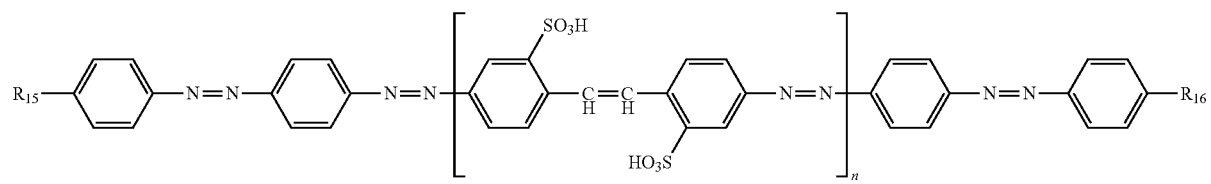

wherein Ys represents a single body transmittance and ργ represents a degree of polarization.

19. A polarizing plate, made by providing a protection film on at least one surface of the polarizing element according to claim 1.

20. A liquid crystal display, employing the polarizing plate according to claim 19.

21. A liquid crystal display, employing the polarizing element according to claim 1.

* * * * *